(12) United States Patent
Hirata et al.

(10) Patent No.: US 8,526,129 B2
(45) Date of Patent: Sep. 3, 2013

(54) LENS UNIT, CAMERA MODULE AND MANUFACTURING METHOD OF LENS UNIT

(75) Inventors: Hiroyuki Hirata, Ibaraki (JP); Haruo Arai, Ibaraki (JP); Masatoshi Hashimoto, Ibaraki (JP); Masahiro Suzuki, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 98 days.

(21) Appl. No.: 12/937,073

(22) PCT Filed: Mar. 9, 2009

(86) PCT No.: PCT/JP2009/054461
§ 371 (c)(1),
(2), (4) Date: Nov. 4, 2010

(87) PCT Pub. No.: WO2009/125640
PCT Pub. Date: Oct. 15, 2009

(65) Prior Publication Data
US 2011/0063739 A1    Mar. 17, 2011

(30) Foreign Application Priority Data

Apr. 9, 2008   (JP) ................................ 2008-100942
May 22, 2008  (JP) ................................ 2008-133883

(51) Int. Cl.
*G02B 7/02* (2006.01)
(52) U.S. Cl.
USPC ......................................................... 359/819
(58) Field of Classification Search
USPC .................. 359/819, 820, 822–823
See application file for complete search history.

(56) References Cited

U.S. PATENT DOCUMENTS

| | | | | |
|---|---|---|---|---|
| 5,396,487 A * | 3/1995 | Abe et al. | | 359/819 |
| 6,590,720 B2 * | 7/2003 | Oba | | 359/819 |
| 6,977,782 B2 * | 12/2005 | Maeda et al. | | 359/819 |
| 7,419,315 B2 * | 9/2008 | Hirata et al. | | 396/529 |
| 2005/0168846 A1 * | 8/2005 | Ye et al. | | 359/819 |
| 2006/0158748 A1 | 7/2006 | Hirata et al. | | |
| 2008/0100932 A1 | 5/2008 | Noda et al. | | |

FOREIGN PATENT DOCUMENTS

| | | |
|---|---|---|
| CN | 1808201 A | 7/2006 |
| JP | A-4-166905 | 6/1992 |
| JP | A-2001-027723 | 1/2001 |
| JP | A-2005-283716 | 10/2005 |
| JP | A-2006-11234 | 1/2006 |

(Continued)

OTHER PUBLICATIONS

International Search Report issued in Patent Application No. PCT/JP2009/054461, dated Jun. 23, 2009 (with translation).

*Primary Examiner* — Scott J Sugarman
*Assistant Examiner* — Vipin Patel
(74) *Attorney, Agent, or Firm* — Oliff & Berridge, PLC

(57) ABSTRACT

To implement the alignment of lenses with a simple configuration or by a simple method. A lens unit includes a plurality of lenses each including a lens portion and a flange portion surrounding the lens portion, and a tube portion that holds the plurality of lenses successively arranged along an optical axis. The holder body includes first and second receive portions successively formed along the optical axis. The first receive portion holds the lenses by pressing the side of the flange portion that extends along the optical axis. The second receive portion receives the lens such that the lens can be moved in a direction crossing the optical axis.

14 Claims, 21 Drawing Sheets

(56) References Cited

FOREIGN PATENT DOCUMENTS

| JP | A-2006-154764 | 6/2006 |
| JP | A-2006-235539 | 9/2006 |
| JP | A-2007-240583 | 9/2007 |
| JP | A-2007-248937 | 9/2007 |
| JP | A-2007-333999 | 12/2007 |
| JP | A-2008-3603 | 1/2008 |
| JP | A-2008-158260 | 7/2008 |

* cited by examiner

LENS UNIT, CAMERA MODULE AND MANUFACTURING METHOD OF LENS UNIT

TECHNICAL FIELD

The present invention relates to a lens unit, a camera module, and a manufacturing method of a lens unit.

BACKGROUND ART

In recent years, it has become common to incorporate a camera module into various electronic devices such as mobile phones and notebook personal computers. It is possible to increase the value of electronic devices by embedding a camera module into the electronic devices for adding an image-capturing function to the electronic devices.

In such camera modules, there are various development objectives such as improvement in performance, reduction in size, and reduction in costs.

For example, Patent document 1 discloses a technique to miniaturize a lens unit included in a camera module. In Patent document 1, a groove for holding an adhesive that is used to bond a lens to a lens barrel is formed by coupling recessed portions formed in both of the lens and the lens barrel to each other. By doing so, it eliminates the need to provide another component called "lens supporter" that has been indispensable in the past, thus miniaturizing the lens unit.

[Patent Document 1]
Japanese Unexamined Patent Application Publication No. 2007-333999

DISCLOSURE OF INVENTION

Technical Problem

Incidentally, in order to increase the resolution of a camera module, it is sometimes preferable to adjust the position of a lens(es) by alignment. In this alignment process, a lens to be moved is moved with respect to a fixed lens and is positioned at a place where the MTF (Modulation Transfer Function) characteristic (resolution) is maximized. Then, the moved lens is fixed at that place.

In the case of Patent document 1, a lens is pressed into a lens barrel by using the outer shape (shape as viewed from the top) of the lens as a basis. The lens is held by the lens barrel such a manner that the lens is being pressed by the lens barrel.

Lenses are components that are mass-produced by metallic molding. Therefore, each of the lenses that are actually produced may have a variation in its shape (in particular, shape of lens as viewed from the top) among the lenses due to production error of the molds, deviation caused by the gap between mold engaging portions, wear of the mold, and the like. Accordingly, it is difficult to position a lens as intended just by pressing the lens into a lens barrel by applying a pressure for setting the lens held by the lens barrel.

When stacked lenses are to be aligned, the following procedure may be employed. Firstly, lenses are stacked and positioned with respect to each other. Next, a lens in the uppermost layer is placed above the stacked body of the lenses. Then, the placed lens is moved and then fixed at a place where the MTF characteristic is maximized. After that, a lens barrel is attached over the whole stacked lenses.

However, when the lenses are aligned in this way, a certain time is required to stack the lenses. Therefore, the alignment cannot be easily performed. As described above, it has been strongly desired to achieve the alignment of lenses with a simple procedure.

The present invention has been made to solve the problem as such, and an object thereof is to achieve the alignment of a lens(es) with a simple configuration or by a simple method.

Technical Solution

A lens unit in accordance with the present invention includes: a plurality of lenses each comprising a lens portion and a flange portion surrounding the lens portion; and a holder body that holds the plurality of lenses that are successively arranged along an optical axis, wherein the holder body includes first and second receive portions successively formed along the optical axis, the first receive portion holds the lens by pressing a side of the flange portion that extends along the optical axis, and the second receive portion receives the lens such that the lens can be moved in a direction crossing the optical axis.

Alignment can be easily performed by moving the lens received in the second receive portion.

The lens unit preferably further includes a plurality of protrusions that are formed on an inner surface of the second receive portion and protrude toward the optical axis, and an adhesive that is injected into a space between the protrusions adjacent to each other and used to fixedly-bond the lenses to the holder body or fixedly-bond the lenses to each other.

The second receive portion is preferably located closer to an object side than the first receive portion is.

The first receive portion preferably holds two or more lenses by pressing a side of the flange portion that extends along the optical axis.

The lens unit preferably further includes a lid-like member that is placed above the lens received in the second receive portion and functions as an optical stop.

The lens unit preferably further includes an optical shield sheet that is placed between the lenses successively arranged along the optical axis and has an opening at a place corresponding to the optical axis. The plurality of lenses are preferably stacked such that the optical shield sheet is sandwiched between the lenses.

A side surface extending along the optical axis is preferably formed on a surface of the flange portion that is opposed to the optical shield sheet.

A camera module in accordance with the present invention includes: a plurality of lenses each comprising a lens portion and a flange portion surrounding the lens portion; a holder body that holds the plurality of lenses that are successively arranged along an optical axis; and an image-capturing element that captures an image that is formed through the plurality of lenses, wherein the holder body includes first and second receive portions successively formed in a direction getting away from the image capturing element, the first receive portion holds the lens by pressing a side of the flange portion that extends along the optical axis, and the second receive portion receives the lens such that the lens can be moved in a direction crossing the optical axis.

A manufacturing method of a lens unit in accordance with the present invention is a manufacturing method of a lens unit including a plurality of lenses and a holder body that holds the plurality of lenses, the manufacturing method including: pressing the lens into a first receive portion of the holder body by applying a pressure; putting the lens in a second receive portion of the holder body such that the lens can be moved in a direction crossing the optical axis; moving the lens in the second receive portion in a direction crossing the optical axis; positioning the lens in the second receive portion with respect to the holder body; and fixedly-bonding the lens in the second receive portion to the holder body or fixedly-bonding the lenses to each other.

A lens unit in accordance with the present invention is a lens unit that outputs a bundle of incident rays through a plurality of lenses, including: a plurality of lenses each comprising a lens portion and a flange portion surrounding the lens portion; and a holder body that holds the plurality of lenses that are successively arranged along an optical axis, wherein the holder body receives at least one of the lenses such that the lens can be moved in a direction crossing the optical axis, and the flange portion of the lens received in the holder body projects, at least partially, from the holder body toward a light-entering side or a light-exiting side.

The flange portion of the lens received in the holder body projects, at least partially, from the holder body toward the light-entering side or the light-exiting side. The lenses can be easily aligned by attaching a jig to this portion and moving the lens in the direction crossing the optical axis.

The peripheral edge on the light-entering side or the light-exiting side of the flange portion of the lens received in the holder body is preferably located closer to the light-entering side or the light-exiting side than the holder body is.

The lens received in the holder body is preferably disposed on another lens that is held by the holder body.

The holder body preferably holds at least one of the lenses by pressing the side of the flange portion that extends along the optical axis.

The lens received in the holder body is preferably located at a place closest to an object side.

The holder body preferably includes a plurality of recessed portions recessed in a direction getting away from the optical axis, and an adhesive that is used to fix the lens received in the holder body is preferably injected into at least one of the recessed portions.

The lens unit preferably further includes a lid body having an optical opening at a place corresponding to the optical axis, and a plurality of projecting portions that are fitted to the recessed portions of the holder body are preferably formed on a surface on the holder-body side of the lid body.

The adhesive is preferably not injected into the recessed portion to which the projecting portion is fitted.

A wall portion surrounding the optical axis is preferably formed on a surface on the holder-body side of the lid body, and the plurality of the projecting portions are preferably coupled with each other by the wall portion.

The shape of the recessed portion as viewed from the top is preferably an arc shape.

A camera module in accordance with the present invention includes: a plurality of lenses each comprising a lens portion and a flange portion surrounding the lens portion; a holder body that holds the plurality of lenses that are successively arranged along an optical axis; and an image-capturing element that captures an image that is formed through the plurality of lenses, wherein the holder body receives at least one of the lenses such that the lens can be moved in a direction crossing the optical axis, and the flange portion of the lens received in the holder body projects, at least partially, from the holder body toward an object side or an image-capturing element side.

Advantageous Effects

In accordance with the present invention, the alignment of a lens(es) can be implemented with a simple configuration or by a simple method.

EXPLANATION OF REFERENCE

100 CAMERA MODULE
97-99 OPTICAL SHIELD SHEET
50 LENS UNIT
10-40 LENS
60 TUBE PORTION
70 LID PORTION
80 ADHESIVE
82 DEFORMED PORTION
72a WALL PORTION
72b PROTRUSION
72d ISLAND PORTION
72e RECESS
72e PLACEMENT SURFACE
62 PROJECTING PORTION
62a THICK PORTION
62b THIN PORTION
51 HOLDER
52 IMAGE-CAPTURING ELEMENT
53 WIRING SUBSTRATE
54 SIGNAL PROCESSING CIRCUIT
55 FLEXIBLE WIRING
56 CONNECTOR

BEST MODES FOR CARRYING OUT THE INVENTION

Exemplary embodiments of the present invention are explained hereinafter with reference to the drawings. Note that each exemplary embodiment may be simplified for the sake of explanation. Since the drawings are simplified, the technical scope of the present invention should not be narrowly interpreted based on the drawings. The drawings are made solely for the explanation of the technical matters, and they do not reflect precise sizes of the components and the like shown therein. The same components are denoted by the same signs, and duplicated explanation may be omitted. The terms indicating directions such as "up", "down", "left", and "right" are used on the assumption that the figures are viewed from the front.

First Exemplary Embodiment

A first exemplary embodiment of the present invention is explained hereinafter with reference to FIGS. 1 to 9.

Figure 1:
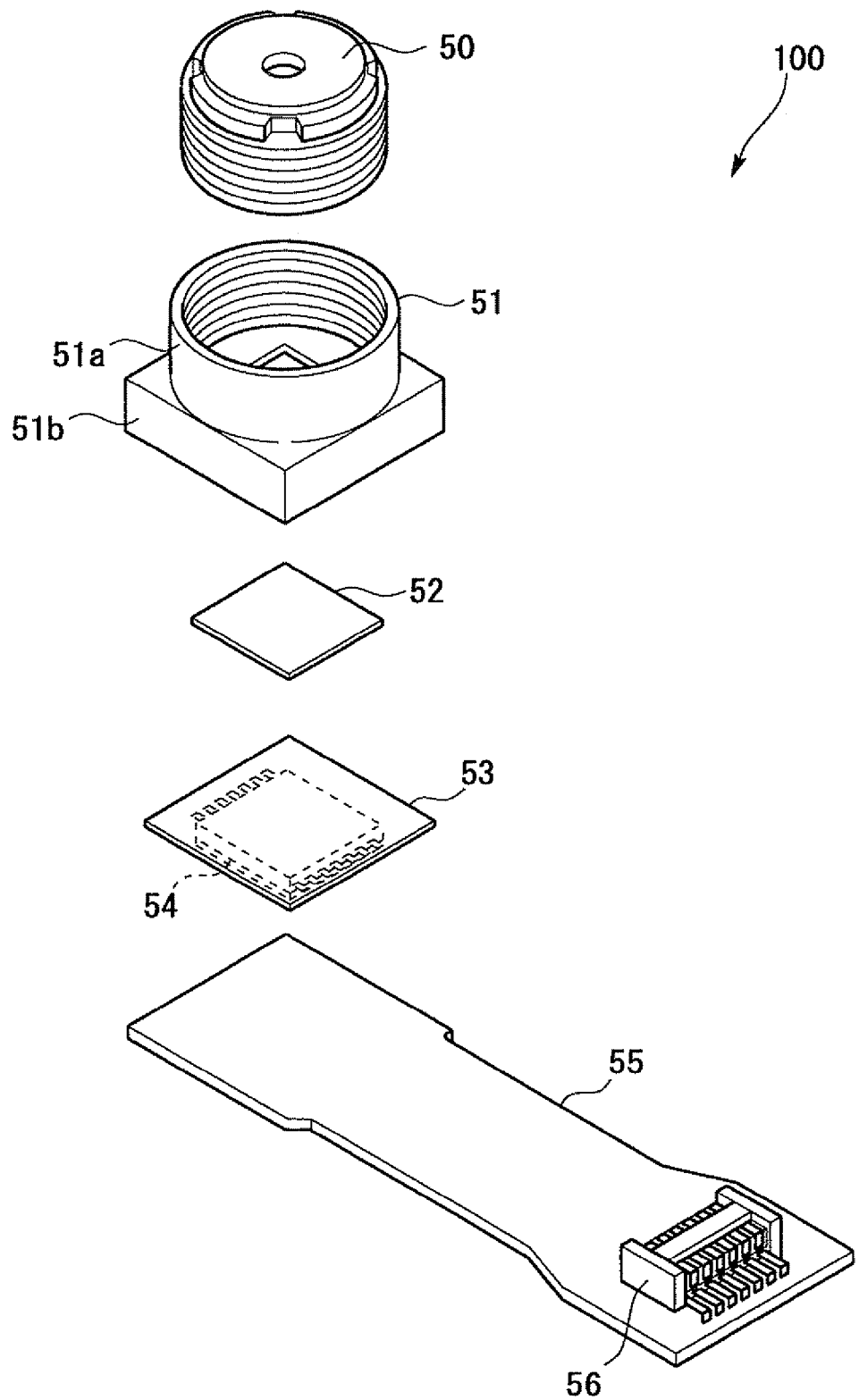
FIG. 1 is an exploded perspective view showing a schematic configuration of a camera module 100 in accordance with a first exemplary embodiment of the present invention.

Firstly, a configuration and functions of a camera module are explained with reference to FIG. 1. As shown in FIG. 1, a camera module 100 includes a lens unit 50, a holder 51, an image-capturing element 52, a wiring substrate 53, a signal processing circuit 54, a flexible wiring 55, and a connector 56.

The camera module 100 is embedded into a compact electronic device such as a mobile phone and a notebook personal computer. The camera module 100 outputs an image captured by the image-capturing element 52 through the connector 56 in the form of an electric signal.

The lens unit 50 is an optical component in which lenses are attached in a lens barrel. A thread groove is formed on the outer surface of the lens unit 50.

The holder 51 is a pedestal component on which the lens unit 50 is attached. The holder 51 includes a tube portion 51a and a base portion 51b. A thread groove is formed on the inner surface of the tube portion 51a. Note that an opening corresponding to the optical axis of the lenses within the lens unit 50 is formed in the holder 51.

The lens unit 50 is attached to the holder 51 by rotating the lens unit 50 such that the thread groove formed on the holder 51 is engaged with the thread groove formed on the lens unit 50.

The image-capturing element 52 is a common image-capturing element such as a CCD (Charge Coupled Device) and a CMOS (Complementary Metal Oxide Semiconductor). A plurality of pixels are formed in a matrix pattern on the image-capturing surface (principal surface) of the image-capturing element 52. The image-capturing element 52 is housed in a housing space provided in the base portion 51b of the holder 51.

The wiring substrate 53 is a plate-like member having a single or multiple wiring layer(s). Wirings on the top and bottom surfaces are mutually connected via a penetrating electrode(s) or the like.

The signal processing circuit 54 is a semiconductor integrated circuit that controls the image-capturing element 52. For example, the signal processing circuit 54 instructs the image-capturing element 52 to accumulate signals and to output the accumulated signals. Further, the signal processing circuit 54 converts an analog signal output from the image-capturing element 52 into a digital signal and outputs the converted digital signal.

The flexible wiring 55 is a flexible wiring substrate. The signal processing circuit 54 is connected to one end of the flexible wiring 55, and the connector 56 is attached to the other end of the flexible wiring 55. The flexible wiring 55 functions as a signal transmission path(s).

The connector 56 is used to connect the camera module 100 to another electronic component (mother board, daughter board, and the like).

Note that, on the flexible wiring 55, the signal processing circuit 54, the wiring substrate 53, the image-capturing element 52, the holder 51, and the lens unit 50 are stacked in this order. Further, the image-capturing element 52, the wiring substrate 53, the signal processing circuit 54, the flexible wiring 55, and the connector are electrically connected in this order. An actual assembling procedure of the camera module 100 may be arbitrarily determined.

The camera module 100 operates in the following manner. Light entering from the object side enters the image-capturing element 52 through the lenses of the lens unit 50. The image-capturing element 52 converts the incident image into an electric signal. The signal processing circuit 54 performs signal processing (A/D conversion, image correction processing, and the like) on the electric signal from the image-capturing element 52. The electric signal output from the signal processing circuit 54 is connected to an external electronic device via the flexible wiring 55 and the connector 56.

A configuration of the lens unit 50 is explained with reference to FIGS. 2 to 6.

Figure 2:
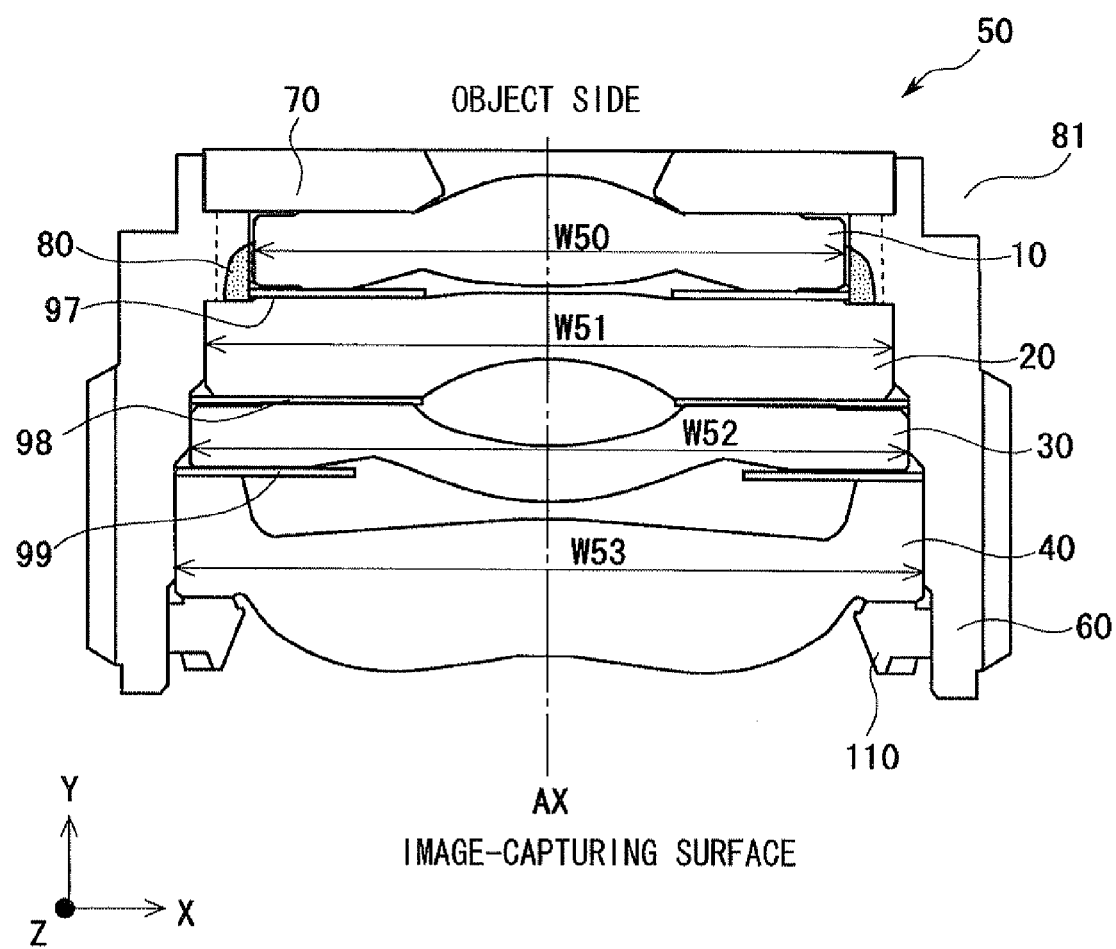
FIG. 2 is a schematic diagram showing a schematic cross-sectional configuration of a lens unit 50 in accordance with a first exemplary embodiment of the present invention.

As shown in FIG. 2, the lens unit 50 includes a lens 10, a lens 20, a lens 30, a lens 40, a tube portion (holder body) 60, a lid portion 70, an optical shield sheet 97, an optical shield sheet 98, an optical shield sheet 99, and a support member 110.

The lenses 10 to 40 form an image from light entering from the object side on the image-capturing surface of the image-capturing element 52. Each of the lenses 10 to 40 includes a lens portion and a flange portion. The lens portion is a portion having an optical function, while the flange portion is a portion used to mechanically fix the lens. The flange portion surrounds the lens portion.

The flange portion of the lens 10 is fixedly-bonded to the tube portion 60 by an adhesive 80. The lens 10 requires alignment. The flange portions of the lenses 20 to 40 are pressed and thereby held by the tube portion 60. The lenses 20 to 40 do not require alignment. The optical shield sheet 97 disposed between the lens 10 and the lens 20 is not indispensable, and bonding of the lens 10 and the lens 20, bonding of the lens 10, the lens 20 and the tube portion 60, or bonding of the lens 10, the optical shield sheet 97 and the lens 20 may be also employed.

The lens width (lens width when the lens is viewed from the top) W50 of the lens 10, the lens width W51 of the lens 20, the lens width W52 of the lens 30, and the lens width W53 of the lens 40 satisfy a relation "W50<W51<W52<W53".

Note that the lens surface on the front side of the lens 10 has a convex shape and the lens surface on the rear side has a convex shape. The lens surface on the front side of the lens 20 has a convex shape and the lens surface on the rear side has a concave shape. The lens surface on the front side of the lens 30 has a concave shape and the lens surface on the rear side has a convex shape. The lens surface on the front side of the lens 40 has a convex shape and the lens surface on the rear side has a convex shape with a concave shape in the central portion.

The tube portion 60 is a tube-like member extending along the optical axis. The tube portion 60 includes a receive portion that receives the lens 10 and another receive portion that receives the lenses 20 to 40. The tube portion 60 holds the lens 10 received in the receive portion such that the lens 10 can be moved. Further, the tube portion 60 holds the lenses 20 to 40 press-fitted in the receive portion such that they are pressed by the tube portion 60.

The opening width of the tube portion 60 becomes wider toward the bottom end in a successive manner so as to correspond to the lens widths of the lenses 10 to 40. The receive portion that receives the lens 10 is formed in the tube portion 60 by conforming the opening width of the tube portion 60 to the lens width of the lens 10. The receive portion that receives the lenses 20 to 40 is formed in the tube portion 60 by conforming the opening width of the tube portion 60 to the lens widths of the lenses 20 to 40.

The opening width of the receive portion of the tube portion 60 that receives the lens 10 is wider than the lens width W50 of the lens 10 by about 100 μm (note that the opening width of the receive portion of the tube portion 60 that receives the lens 10 is preferably wider than the lens width W50 of the lens 10 by about 30 to 150 μm) Meanwhile, the opening width of the receive portion of the tube portion 60 that receives the lens 20 is narrower than the lens width W51 of the lens 20 by about 5 μm (note that the opening width of the receive portion of the tube portion 60 that receives the lens 20 is preferably narrower than the lens width W51 of the lens 20 by about 0 to 15 μm (with the exception of 0)). The opening width of the receive portion of the tube portion 60 that receives the lens 30 is narrower than the lens width W52 of the lens 30 by about 5 μm (likewise the case described above, it may be a range from 0 to 15 μm (with the exception of 0)). The opening width of the receive portion of the tube portion 60 that receives the lens 40 is narrower than the lens width W53 of the lens 40 by about 5 μm (likewise the case described above, it may be a range from 0 to 15 μm (with the exception of 0)).

The lens 10 can be moved in the XZ-plane when it is placed on the tube portion 60. Therefore, the lens 10 is placed on the lens unit 50 and moved in the XZ-plane to find a place where the MTF characteristic is maximized. Then, the alignment can be achieved by fixing the lens 10 at the place where the MTF characteristic is maximized.

In this exemplary embodiment, the lens 10, which requires alignment, is received in the receive portion of the tube portion 60 such that the lens 10 can be moved, while the lenses 20 to 40, which do not require alignment, are pressed into the receive portion of the tube portion by applying a pressure. Since the lenses 10 to 40 do not need to be stacked before being attached in the lens barrel, the assembling of the lens unit can be simplified. Since the lenses 20 to 40, which do not require alignment, are held in the tube portion 60 in advance in a state where they are pressed by the tube portion 60, the lens 10 can be placed above the lens 20 and moved in the XZ-directions in a stable manner. Since the lenses 20 to 40 are simply pressed into the tube portion 60 by applying a pressure, the assembling of the lens unit 50 is very simple. Further, since a sufficient adhesive space is secured between the lens 10 and the tube portion 60, the lens 10 can be reliably and fixedly bonded to the tube portion 60.

The lid portion 70 is a planar member. The lid portion 70 has a circular shape as viewed from the top. The lid portion 70 has an opening corresponding to the optical axis AX. Further, the edge around the opening of the lid portion 70 is tapered toward the optical axis AX. The lid portion 70 is black, and the lid portion 70 functions as an optical stop with the opening formed in the lid portion 70. The lid portion 70 is fixedly-bonded to the tube portion 60 by conventional bonding means above the lens 10. When the lens unit 50 is attached to the holder 51, no force is exerted on the lid portion 70. Therefore, the lid portion 70 may have a thin disk shape.

Each component included in the lens unit 50 has the following positional relation. The lenses 10 to 40 are stacked along the optical axis AX. The optical shield sheet 97 is disposed between the lenses 10 and 20. The optical shield sheet 98 is disposed between the lenses 20 and 30. The optical shield sheet 99 is disposed between the lenses 30 and 40. The tube portion 60 houses the lenses 10 to 40. The lid portion 70 is fixed on the front of the tube portion 60.

Each of the optical shield sheets 97 to 99 has an opening at a place corresponding to the optical axis AX of the lenses. Each of the optical shield sheets 97 to 99 has a circular shape as viewed from the top. The width of the optical shield sheet 97 along the X-axis is narrower than the width of the optical shield sheet 98 along the X-axis. The width of the optical shield sheet 98 along the X-axis is narrower than the width of the optical shield sheet 99 along the X-axis. Note that the opening formed on each of the optical shield sheets 97 to 99 is a circular opening.

The lenses 10 to 40 are molded from a resin (for example, cycloolefin polymer resin) by using a metallic mold(s). The tube portion 60 and the lid portion 70 are molded from a resin (for example, polycarbonate resin) by using a metallic mold(s). Note that the mutual adherence between the tube portion 60 and the lid portion 70 can be increased by using the same material for them.

After the alignment, the lens 10 is fixedly-bonded to the tube portion 60 by conventional fixing means (application of an adhesive 80 or the like). After that, the lid portion 70 is fixed above the tube portion 60 by conventional fixing means (application of the adhesive 80 or the like) (alternatively, the lid portion 70 may be fixedly-bonded to either one or both of the tube portion 60 and the lens 10). Note that in this process, since the adhesive can be externally applied, the lens 10 and the lid portion 70 can be fixedly-bonded to the tube portion 60 with ease.

Figure 3A:
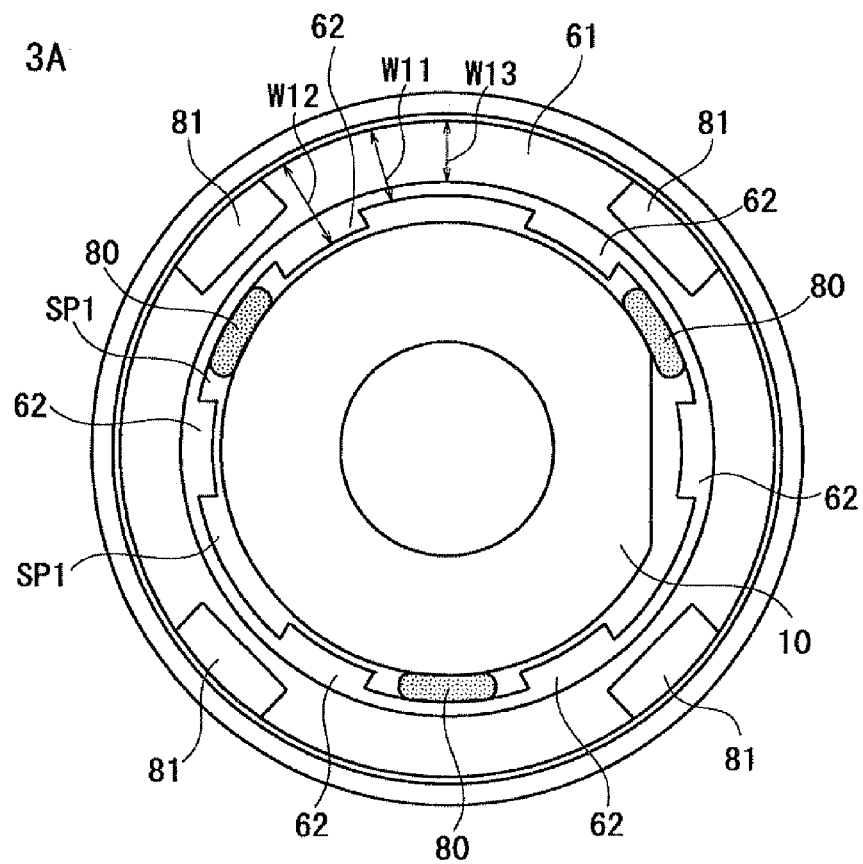
FIG. 3A is a schematic diagram showing an upper-surface configuration and a cross-sectional configuration of a tube portion 60 in accordance with a first exemplary embodiment of the present invention.
Figure 3B:
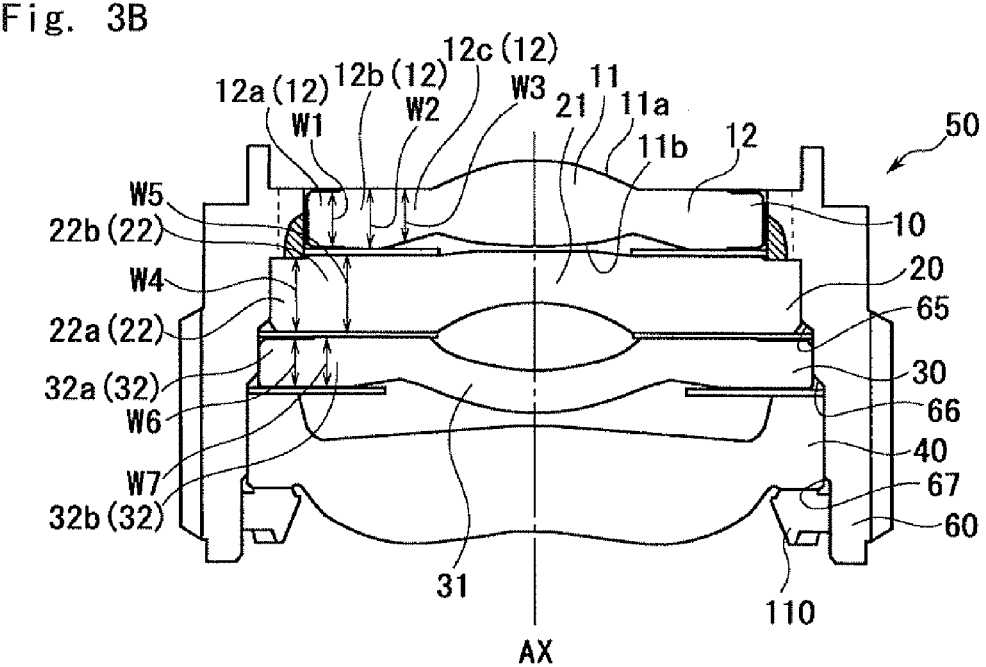
FIG. 3B is a schematic diagram showing a side-surface configuration and a cross-sectional configuration of a tube portion 60 in accordance with a first exemplary embodiment of the present invention.

A configuration of the tube portion 60 holding the lenses 10 to 40 is explained with reference to FIG. 3. FIG. 3A is a plane view showing an upper-surface configuration of the tube portion 60 holding the lenses 10 to 40. FIG. 3B is a schematic diagram showing a cross-sectional configuration of the tube portion 60 holding the lenses 10 to 40.

As shown in FIG. 3A, the tube portion 60 includes a ring-shaped body 61 in the front-end portion in which four recessed portions 81 are formed. The lens unit 50 is screwed into the holder 51 by engaging a rotation jig with the recessed portions 81.

The tube portion 60 includes six projecting portions 62 protruding toward the optical axis AX. These six projecting portions 62 are successively arranged along a circle centered on the optical axis AX. Recessed portions are formed between neighboring projecting portions 62. An adhesive that is used to fix the lens 10 to the tube portion 60 is applied to spaces SP1 formed by the projecting portions 62. The lens 10 is firmly and fixedly bonded to the tube portion 60 by applying the adhesive to the spaces SP1. Note that the projecting portions 62 function as a regulation portion to regulate the movable range of the lens 10. By providing the regulation portion in the tube portion 60, the alignment can be achieved just by moving the lens 10 slightly. Further, sufficient adhesive spaces (spaces SP1) can be secured by forming the projecting portions 62.

The width W11 between the inner surface of the tube portion 60 (portion in which no projecting portion 62 is formed) and the outer surface of the tube portion 60, the width W12 between the inner surface of the projecting portions 62 and the outer surface of the tube portion 60, and the width W13 of the ring-shaped body 61 satisfy a relation "W12>W11>W13". Note that a receive portion that receives the lid portion 70 is formed by the upper-end portion (including the ring-shaped body 61 and the projecting portions 62) of the tube portion 60.

As shown in FIG. 3B, a slope 65, a slope 66, and a slope 67 are formed on the inner surface of the tube portion 60. The slope 65 regulates the position of the optical shield sheet 98 and the lens 30. The slope 66 regulates the position of the optical shield sheet 99 and the lens 40. The slope 67 regulates the position of the support member 110.

Note that as shown in FIG. 3B, the lens 10 includes a lens portion 11 and a flange portion 12. The lens portion 11 has a lens surface 11a and a lens surface 11b. The flange portion 12 includes an outer portion 12a having a thickness W1, a middle portion 12b having a thickness W2, and an inner portion 12c having a thickness W3. A relation "W1<W2" is satisfied. A relation "W3≦W2" is satisfied. The thickness W3 becomes gradually thinner toward the optical axis AX.

The boundary portion between the outer portion 12a and the middle portion 12b corresponds to the boundary portion between the mold for the outer portion 12a and the mold for the middle portion 12b. By determining the thickness of the outer portion 12a and the thickness of the middle portion 12b as described above, it is possible to effectively prevent the position of the lens from being deviated from a desired position due to burr and the like that is likely to occur at the boundary portion of the molds.

Likewise the lens 10, the lens 20 also includes a lens portion 21 and a flange portion 22. The flange portion 22 includes an outer portion 22a having a thickness W4 and an inner portion 22b having a thickness W5. A relation "W4<W5" is satisfied. The boundary portion between the outer portion 22a and the inner portion 22b corresponds to the boundary portion between the mold for the outer portion 22a and the mold for the inner portion 22b. By determining the thickness of the outer portion 12a and the thickness of the middle portion 12b as described above, it is possible to effectively prevent the position of the lens 20 from being deviated from a desired position due to burr and the like that is likely to occur at the boundary portion of the molds.

Likewise the lens 10, the lens 30 also includes a lens portion 31 and a flange portion 32. The flange portion 32 includes an outer portion 32a having a thickness W6 and an inner portion 32b having a thickness W7. A relation "W6<W7" is satisfied. The boundary portion between the outer portion 32a and the inner portion 32b corresponds to the boundary portion between the mold for the outer portion 32a and the mold for the inner portion 32b. By determining the thickness of the outer portion 32a and the thickness of the inner portion 32b as described above, it is possible to effectively prevent the position of the lens 30 from being deviated from a desired position due to burr and the like that is likely to occur at the boundary portion of the molds.

The burr formed at the boundary portion of molds is explained with reference to FIGS. 4 to 6C. The following explanation is made while paying attention to the lens 20.

Figure 4:
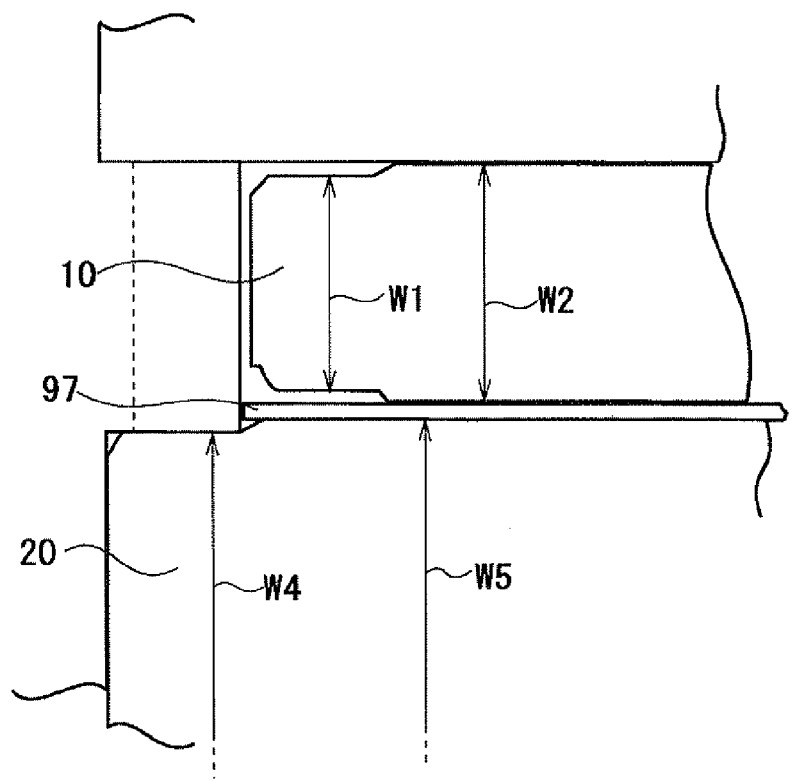
FIG. 4 is a partial enlarged view of a lens unit 50 in accordance with a first exemplary embodiment of the present invention.

FIG. 4 shows a partial enlarged view of the lens unit 50. As shown in FIG. 4, a slope is formed between the outer portion 22a having the thickness W4 and the inner portion 22b having the thickness W5.

Figure 5:
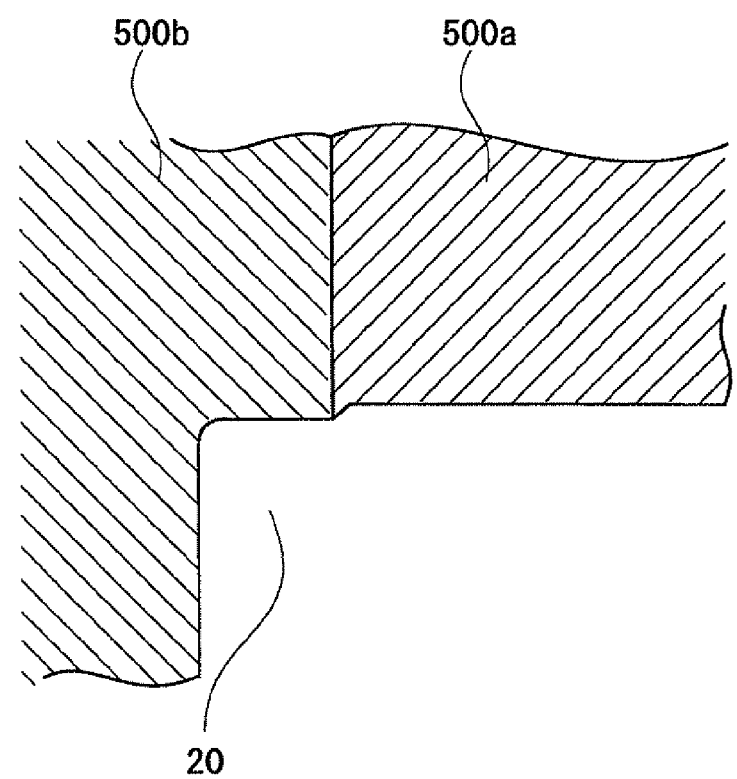
FIG. 5 is an explanatory figure showing a state of a mold during manufacturing in accordance with a first exemplary embodiment of the present invention.

As shown in FIG. 5, the portion between the outer portion 22a and the inner portion 22b is located at the boundary between a metallic mold 500a and a metallic mold 500b. At the boundary of the metallic molds, burr and the like is likely to occur on the surface of the lens to be formed. In this exemplary embodiment, a slope is formed at a place of the lens surface that corresponds to the boundary of the metallic molds as shown in FIG. 4.

Figure 6A:
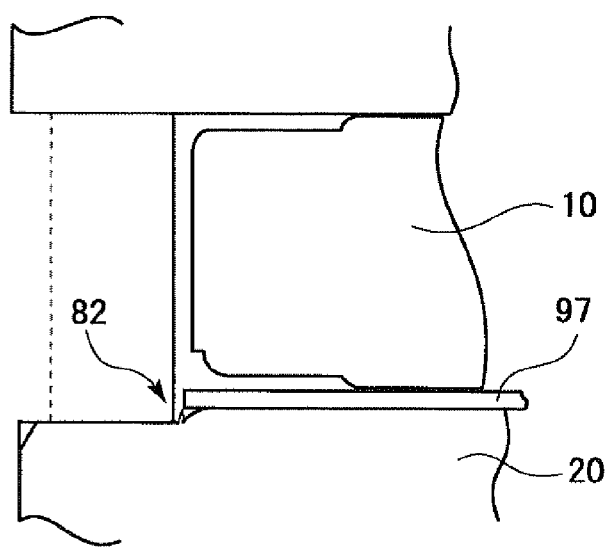
FIG. 6A is a partial enlarged view of a lens unit 50 in accordance with a first exemplary embodiment of the present invention.
Figure 6B:
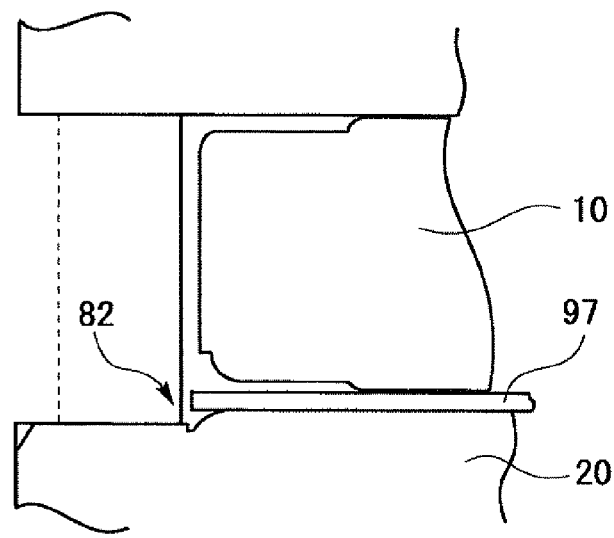
FIG. 6B is a partial enlarged view of a lens unit 50 in accordance with a first exemplary embodiment of the present invention.
Figure 6C:
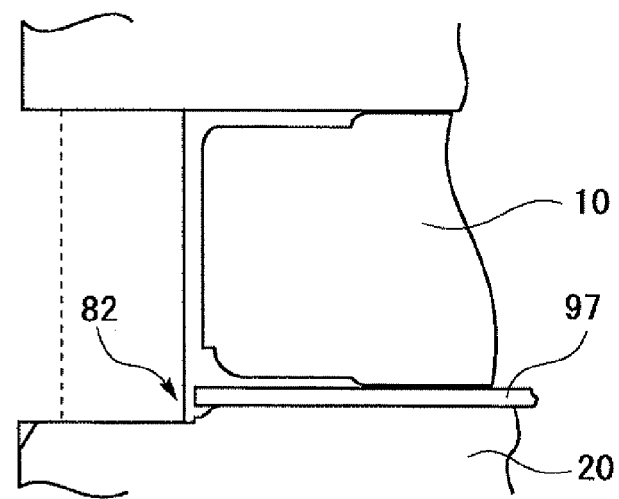
FIG. 6C is a partial enlarged view of a lens unit 50 in accordance with a first exemplary embodiment of the present invention.

Therefore, even if deformation is caused in a place corresponding to the boundary of the metallic molds as shown in FIGS. 6A to 6C, it is still possible to effectively prevent the position of the lens 20 from being deviated due to its influence. Then, it is also possible to effectively prevent the position of the lens 10, which is disposed above the lens 20, from being deviated due to the deviation in the position of the lens 20.

Note that in FIG. 6A, a protrusion is formed on the surface of the lens 20 as a deformed portion 82. In FIG. 6B, a recess is formed on the surface of the lens 20 as a deformed portion 82. In FIG. 6C, a projecting portion is formed on the surface of the lens 20 as a deformed portion 82.

As obvious from the above explanation, the lens 10, which requires alignment, is received in the receive portion of the tube portion 60 such that the lens 10 can be moved, while the lenses 20 to 40, which do not require alignment, are pressed into the receive portion of the tube portion by applying a pressure in this exemplary embodiment. Since the lenses 10 to 40 do not need to be stacked before being attached in the lens barrel, the assembling of the lens unit can be easily performed. Since the lenses 20 to 40, which do not require alignment, are held in the tube portion 60 in advance in a state where they are pressed by the tube portion 60, the lens 10 can be placed above the lens 20 and moved in the XZ-directions in a stable manner. By simplifying the assembling process of the lens unit 50, the productivity of the lens unit 50 can be effectively increased.

Assembling of the lens unit 50 is explained with reference to FIGS. 7A to 7D.

Figure 7A:
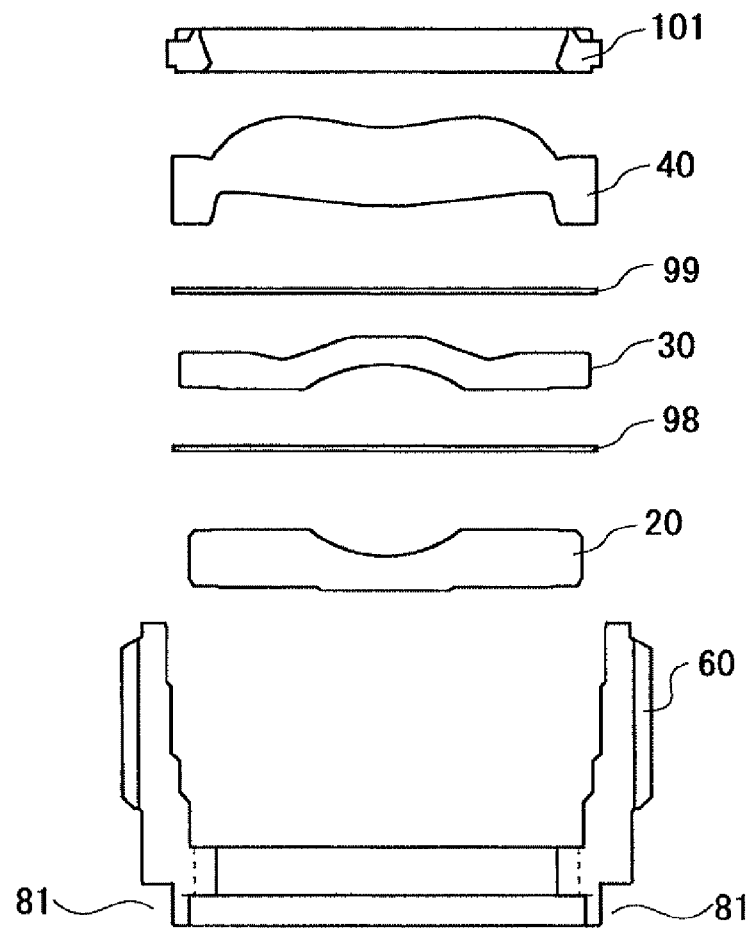
FIG. 7A is an explanatory figure showing an assembling procedure of a lens unit 50 in accordance with a first exemplary embodiment of the present invention.

Firstly, as shown in FIG. 7A, the lens 20, the lens 30, and the lens 40 are successively pressed into the receive portion of the tube portion 60, in this order, by applying a pressure. Note that the optical shield sheet 98 is disposed between the lenses 20 and 30. The optical shield sheet 99 is disposed between the lenses 30 and 40. Then, the stacked body of the lenses 20 to 40 is pressed into the tube portion 60 by applying a pressure with the support member 110. Next, the support member 110 is fixedly-bonded to the tube portion 60 by conventional bonding means such as an adhesive. In this example, an ultraviolet-curable resin is applied to a space between the support member 110 and the tube portion 60, and the ultraviolet-curable resin is cured by irradiating it with ultraviolet rays.

Figure 7B:
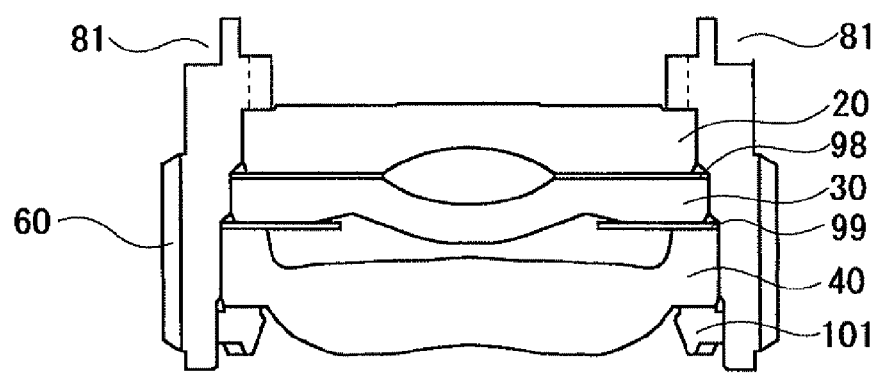
FIG. 7B is an explanatory figure showing an assembling procedure of a lens unit 50 in accordance with a first exemplary embodiment of the present invention.

Next, as shown in FIG. 7B, the tube portion 60 holding the lenses 20 to 40 is turned over.

Figure 7C:
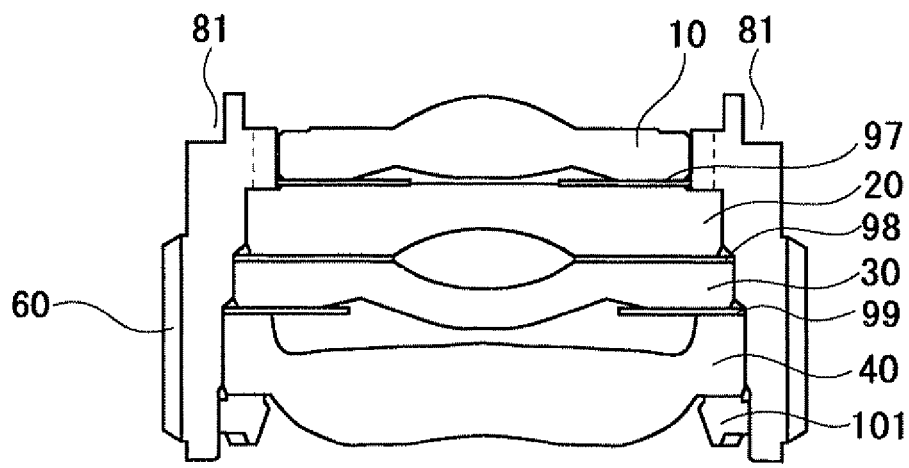
FIG. 7C is an explanatory figure showing an assembling procedure of a lens unit 50 in accordance with a first exemplary embodiment of the present invention.

Next, as shown in FIG. 7C, the optical shield sheet 97 is disposed on the tube portion 60 and the lens 10 is placed in the receive portion of the tube portion 60. Then, the lens 10 is moved in the XZ plane and positioned at a place where the MTF characteristic is maximized. An ultraviolet-curable adhesive is applied to the spaces SP1 between the lens 10 and the tube portion 60 and, after that, the ultraviolet-curable adhesive is irradiated with ultraviolet rays. In this way, the lens 10 is reliably and fixedly bonded to the tube portion 60 through the adhesive in a state where the lens 10 is aligned (alternatively, the lens 10 may be fixedly-bonded to either one or both of the tube portion 60 and the lens 20).

Figure 7D:
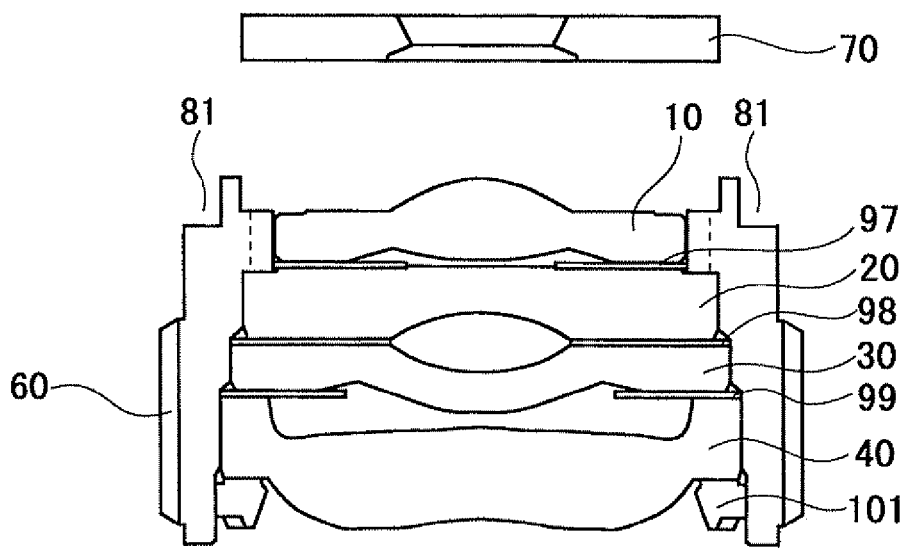
FIG. 7D is an explanatory figure showing an assembling procedure of a lens unit 50 in accordance with a first exemplary embodiment of the present invention.

Next, as shown in FIG. 7D, the lid portion 70 is placed on the lens 10. Then, an ultraviolet-curable adhesive is applied to a gap between the lid portion 70 and the tube portion 60 and, after that, the ultraviolet-curable adhesive is irradiated with ultraviolet rays. In this way, the lid portion 70 is fixedly-bonded to the tube portion 60 through the adhesive.

Figure 8:
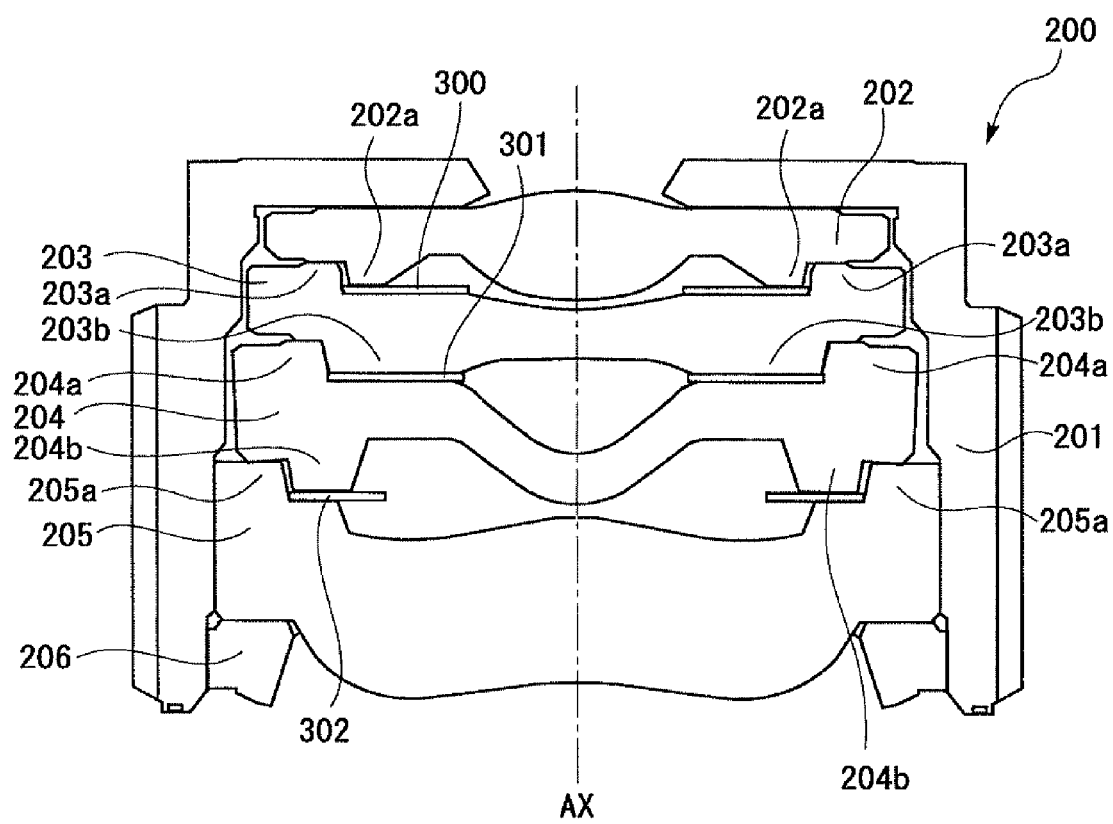
FIG. 8 is a schematic diagram showing a schematic cross-sectional configuration of a lens unit 200 in accordance with a reference example of a first exemplary embodiment of the present invention.
Figure 9A:
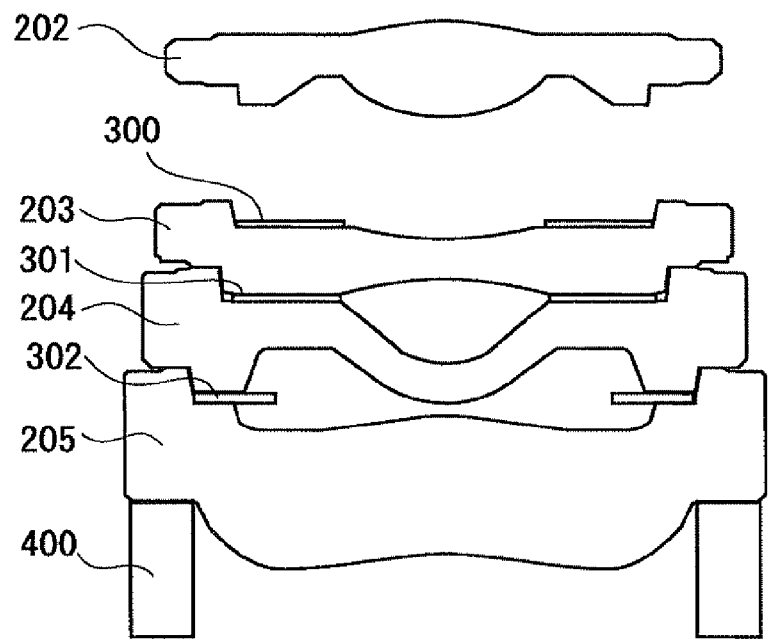
FIG. 9A is an explanatory figure showing a manufacturing procedure of a lens unit 200 in accordance with a reference example of a first exemplary embodiment of the present invention.
Figure 9B:
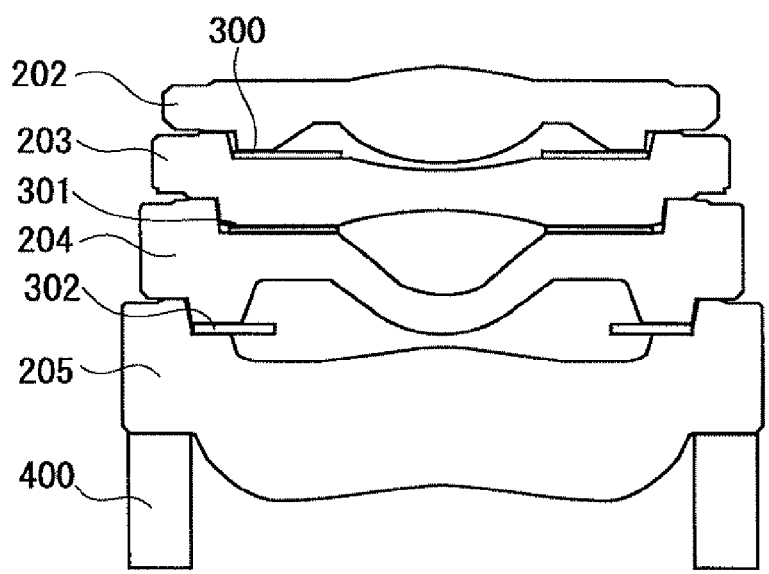
FIG. 9B is an explanatory figure showing a manufacturing procedure of a lens unit 200 in accordance with a reference example of a first exemplary embodiment of the present invention.
Figure 9C:
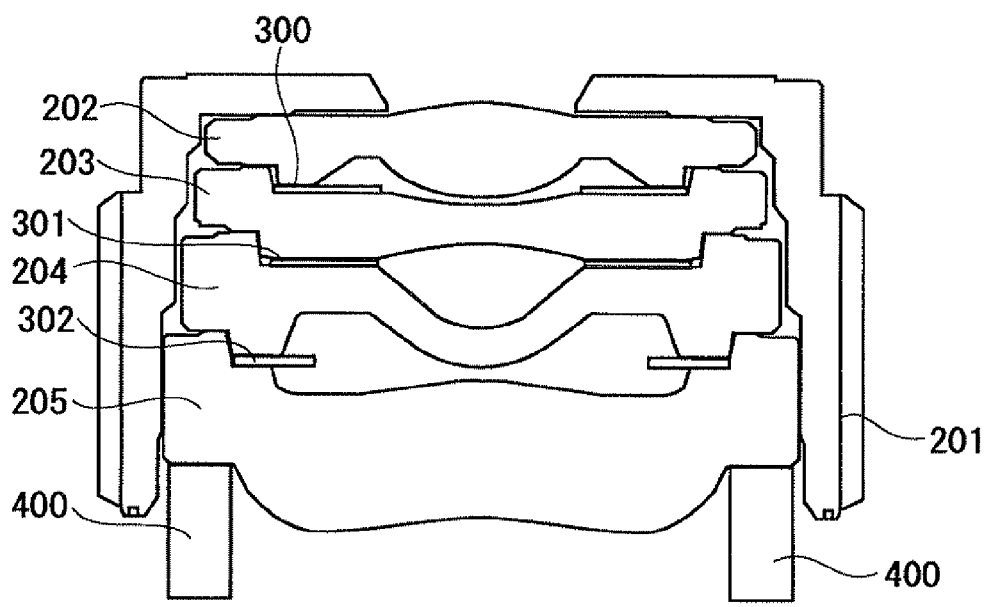
FIG. 9C is an explanatory figure showing a manufacturing procedure of a lens unit 200 in accordance with a reference example of a first exemplary embodiment of the present invention.
Figure 9D:
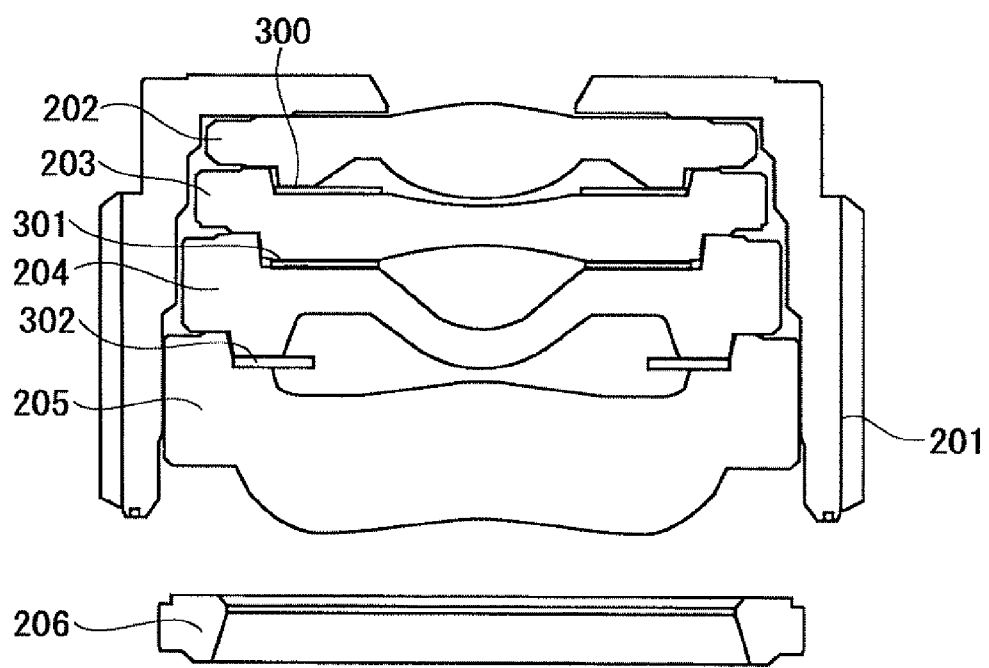
FIG. 9D is an explanatory figure showing a manufacturing procedure of a lens unit 200 in accordance with a reference example of a first exemplary embodiment of the present invention.

Hereinafter, a reference example shown in FIGS. 8 to 9D is explained.

As shown in FIG. 8, a lens unit 200 includes a tube portion 201, a lens 202, a lens 203, a lens 204, a lens 205, a support member 206, an optical shield sheet 300, an optical shield sheet 301, and an optical shield sheet 302.

The lenses 202 to 205 are housed in the tube portion 201 in a stacked state. The lenses 202 to 205 are fixed in the tube portion 201 by the support member 206. Note that the support member 206 is fixedly-bonded to the tube portion 201 by an adhesive. Further, the optical shield sheet 300 is disposed between the lenses 202 and 203. Similarly, the optical shield sheet 301 is disposed between the lenses 203 and 204. Similarly, the optical shield sheet 302 is disposed between the lenses 204 and 205.

The lens 204 is fixed above the lens 205. A protrusion 204b of the lens 204 is pressed toward the optical axis AX by a protrusion 205a of the lens 205.

Similarly, the lens 203 is fixed above the lens 204. A protrusion 203b of the lens 203 is pressed toward the optical axis AX by a protrusion 204a of the lens 204.

The lens 202 is placed above the lens 203 such that the lens 202 can be moved in the horizontal direction. A protrusion 202a of the lens 202 is not pressed toward the optical axis AX by a protrusion 203a of the lens 204. The lens 202 can be moved in the XZ-plane above the lens 203.

In this case, the lens 202 is aligned such that the lenses 203 to 205 are stacked. The lenses 203 to 205 are not mechanically fixed to a sufficient level. Therefore, it requires a high degree of carefulness to place the lens 202 above the stacked body of the lenses 203 to 205. Accordingly, the time required for the placement of the lens 202 becomes longer. Further, for a similar reason, the time required to align the lens 202 by moving it also becomes longer. Furthermore, after the lens is positioned, an adhesive needs to be applied to a space between the lenses having a small diameter. Therefore, a sufficient adhesive space cannot be secured.

An assembling procedure of the lens unit 200 is explained with reference to FIGS. 9A to 9D.

FIGS. 9A to 9D are explanatory figures showing a manufacturing procedure of the lens unit 200.

Firstly, as shown in FIG. 9A, the lens 205, the optical shield sheet 302, the lens 204, the optical shield sheet 301, the lens 203, and the optical shield sheet 300 are successively disposed above a pedestal 400. Note that the lens 204 is fixed above the lens 205 by the above-described engaging structure. Similarly, the lens 203 is fixed above the lens 204.

Next, the lens 202 is disposed as shown in FIG. 9B. Then, the lens 202 is aligned by moving it. After the alignment, the lens 202 is fixed above the lens 203 by conventional fixing means (ultraviolet-curable resin or the like).

Next, the stacked body of the lenses is housed in the tube portion 201 as shown in FIG. 9C.

Next, the stacked body of the lenses is fixed within the tube portion 201 by the support member 206 as shown in FIG. 9D. The support member 206 is fixedly-bonded to the tube portion 201 by conventional fixing means (ultraviolet-curable resin or the like).

In the case of the lens unit 200, the lens 202 is aligned in a state where the lenses 203 to 205 are stacked. The lenses 203 to 205 are not structurally stable to a sufficient level. Therefore, it requires a high degree of carefulness to place the lens 202 above the stacked body of the lenses 203 to 205. Accordingly, the time required for the placement of the lens 202 becomes longer. Further, for a similar reason, the time required to align the lens 202 by moving it also becomes longer. Furthermore, after the lens is positioned, an adhesive needs to be applied to a space between the lenses having a small diameter. Therefore, a sufficient adhesive space cannot be secured.

In the exemplary embodiment of the present invention, the lens 10, which requires alignment, is placed on the tube portion 60. Then, the lens 10 is moved in the XZ-plane in this state and positioned at a place where the MTF characteristic is maximized. Then, the lens 10 is fixed to the tube portion 60 at that place by an ultraviolet-curable resin or the like. Therefore, the problems including the ones that occur in the case of the lens unit 200 (poor workability, narrow adhesive space, and the like) are effectively solved. Further, since the overall shape of the lenses is less complex in comparison to the lenses of the reference example, the lenses can be easily molded.

Second Exemplary Embodiment

A second exemplary embodiment in accordance with the present invention is explained hereinafter with reference to FIGS. 10A and 10B.

In contrast to the first exemplary embodiment, the number of the projecting portions 62 is different in this exemplary embodiment. Even in the case like this, similar advantageous effects to those of the first exemplary embodiment may be achieved.

Figure 10A:
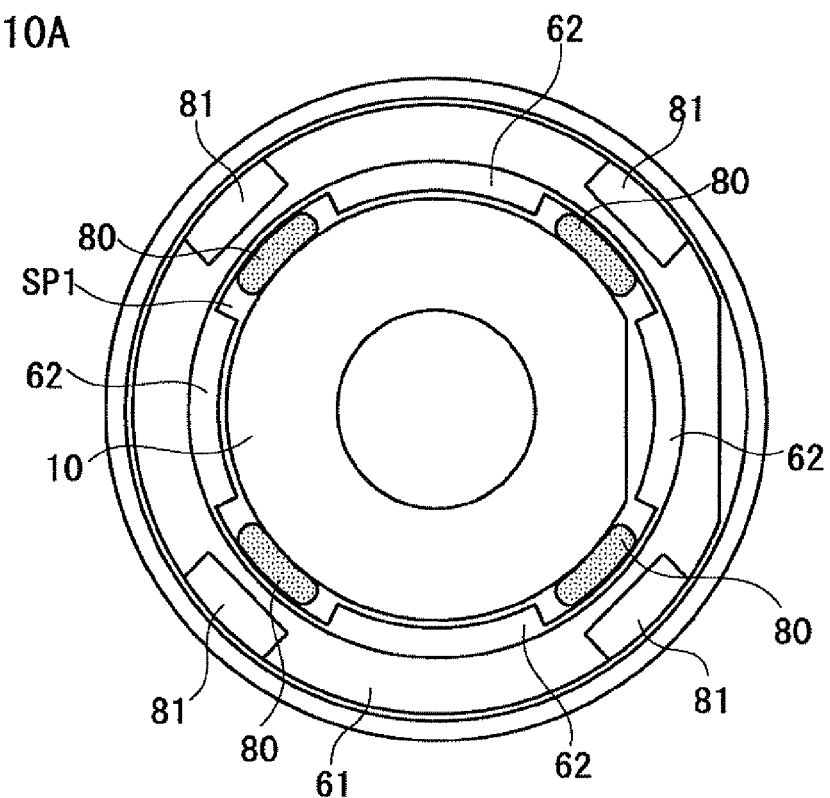
FIG. 10A is a schematic diagram for explaining a variation of the upper-surface configuration of a tube portion 60 in accordance with a second exemplary embodiment of the present invention.
Figure 10B:
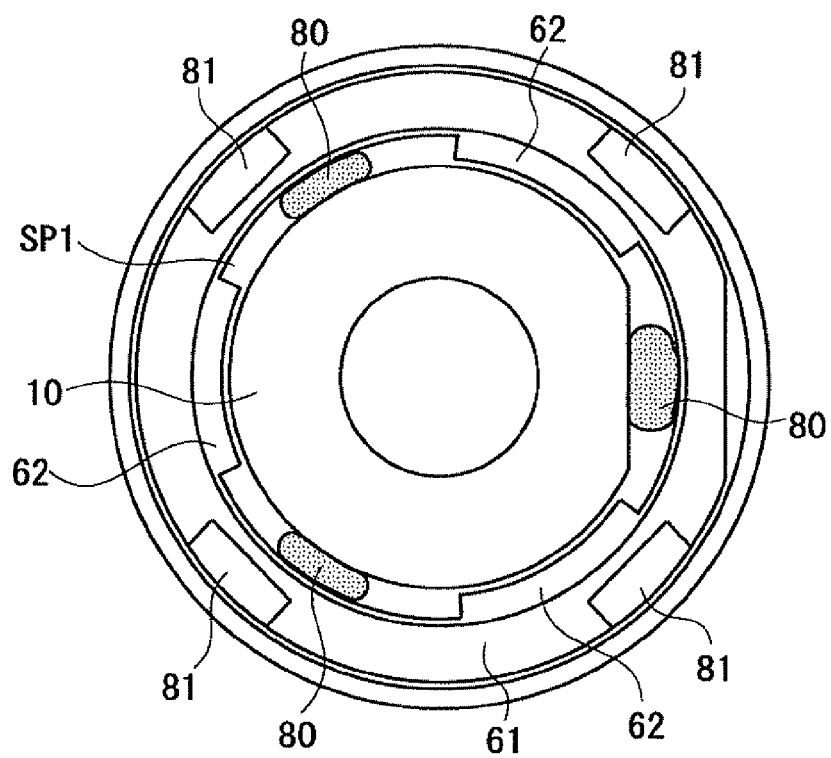
FIG. 10B is a schematic diagram for explaining a variation of the upper-surface configuration of a tube portion 60 in accordance with a second exemplary embodiment of the present invention.

In an example shown in FIG. 10A, the tube portion 60 has four projecting portions 62. In an example shown in FIG. 10B, the tube portion 60 has three projecting portions 62. In either case, similar advantageous effects to those of the first exemplary embodiment can be achieved. Note that the lens 10 can be fixedly-bonded to the tube portion 60 more firmly by increasing the number of the projecting portions 62.

Third Exemplary Embodiment

A third exemplary embodiment in accordance with the present invention is explained hereinafter with reference to FIGS. 11A to 15D.

A configuration of a lens unit 50 is explained with reference to FIGS. 11A to 14B. Note that FIG. 11A shows an end face different from an end face shown in FIG. 11B.

Figure 11A:
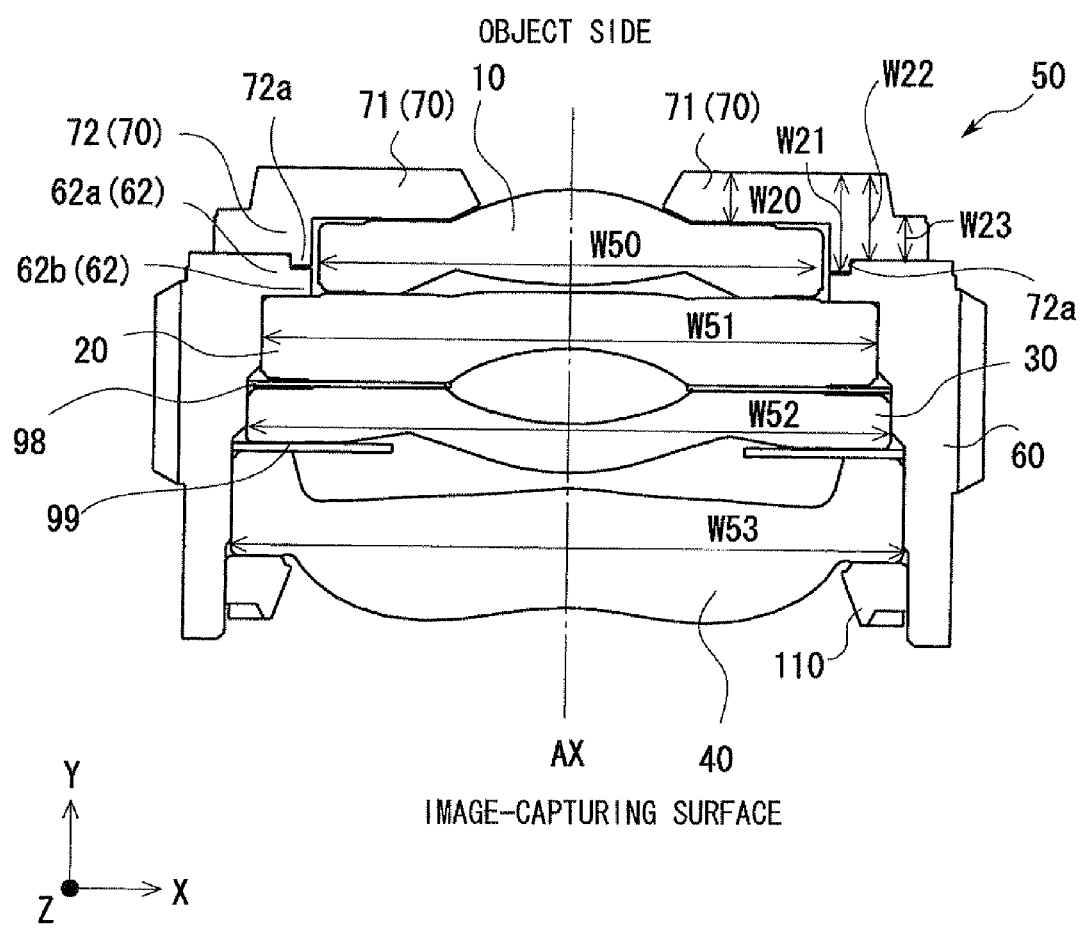
FIG. 11A is a schematic end-face figure of a lens unit 50 in accordance with a third exemplary embodiment of the present invention.
Figure 11B:
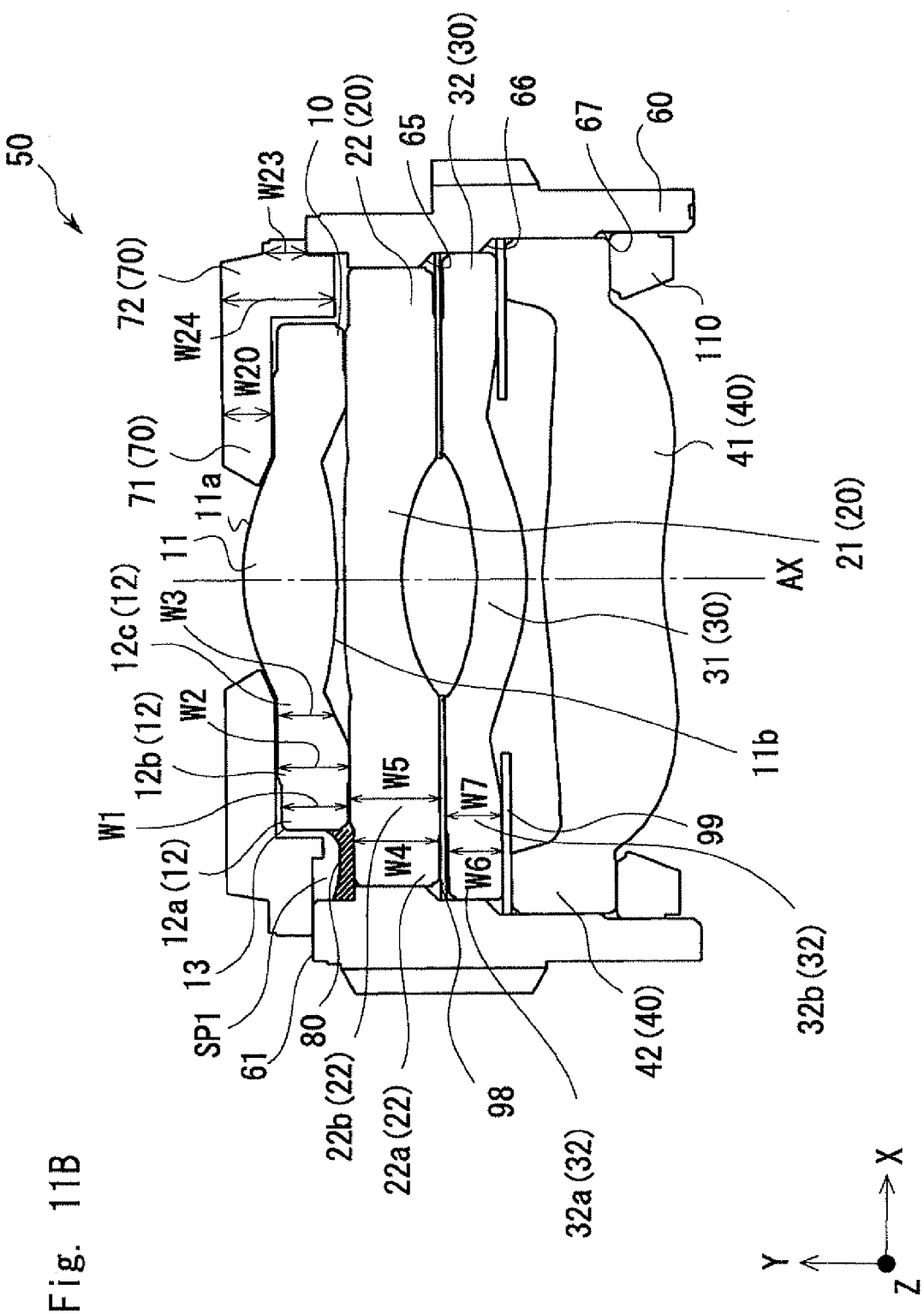
FIG. 11B is a schematic end-face figure of a lens unit 50 in accordance with a third exemplary embodiment of the present invention.

As shown in FIGS. 11A and 11B, the lens unit 50 includes a lens 10, a lens 20, a lens 30, a lens 40, a tube portion (holder body) 60, a lid portion (lid body) 70, an optical shield sheet 98, an optical shield sheet 99, and a support member 110. The lens unit 50 outputs a bundle of rays that enters from the front (object side) to the backward direction (image-capturing element side) through a plurality of lenses.

The lenses 10 to 40 form an image from light entering from the object side on the image-capturing surface of the image-capturing element 52. Each of the lenses 10 to 40 includes a lens portion and a flange portion. The lens portion is a portion having an optical function, while the flange portion is a portion used to mechanically fix the lens. The flange portion surrounds the lens portion.

The lens 10 is fixedly-bonded to the lens 20 or to both the tube portion 60 and the lens 20 through an adhesive 80 (see FIG. 2B). The lens 10 requires alignment. The flange portions of the lenses 20 to 40 are pressed and thereby held by the tube portion 60. The lenses 20 to 40 do not require alignment. That is, they may be simply inserted (press-fitted) into the tube portion 60.

The lens width (lens width when the lens is viewed from the top) W50 of the lens 10, the lens width W51 of the lens 20, the lens width W52 of the lens 30, and the lens width W53 of the lens 40 satisfy a relation "W50<W51≦W52≦W53".

Note that the lens surface on the front side of the lens 10 has a convex shape and the lens surface on the rear side has a convex shape. The lens surface on the front side of the lens 20 has a convex shape and the lens surface on the rear side has a concave shape. The lens surface on the front side of the lens 30 has a concave shape and the lens surface on the rear side has a convex shape. The lens surface on the front side of the lens 40 has a convex shape and the lens surface on the rear side has a convex shape with a concave shape in the central portion. These features are determined to reduce the aberration occurring when an image is captured, and can be arbitrarily determined within the range that does not depart from the present invention.

The lid portion 70 is a planar member. The lid portion 70 has a circular shape as viewed from the top. The lid portion 70 is black, and the lid portion 70 functions as an optical stop with an opening formed in the lid portion 70. The lid portion 70 is fixedly-bonded to the tube portion 60 by conventional bonding means.

The lid portion 70 includes a planar portion 71 and a frame portion 72. The planar portion 71 is a flat plate-like portion in the XZ-plane. The frame portion 72 is a frame-like portion extending along the optical axis AX. A space that partially receives the lens 10 (receive portion) is formed in the lid portion 70 by the frame portion 72. An opening corresponding to the optical axis AX is formed in the planar portion 71. The edge of the planar portion 71 that defines the opening is tapered toward the optical axis AX.

The lid portion 70 includes portions having thicknesses W20 to W24.

In the end face shown in FIG. 11A, the thickness of the lid portion 70 is changed in the order of W20, W21, W22 and W23 in the direction getting away from the optical axis AX. Note that relations "W20<W21", "W20<W22<W21", and "W23<W22" are satisfied. A wall portion 72a described later (see FIG. 4) is formed by defining the thicknesses W20 to W22. An engaging portion 73 described later (see FIG. 3) is formed by defining the thicknesses W22 and W23.

In the end face shown in FIG. 11B, the thickness of the lid portion 70 is changed in the order of W20, W24, and W23 in the direction getting away from the optical axis AX. Note that relations "W20<W24" and "W23<W24" are satisfied. Protrusions 72b described later (see FIGS. 13A and 13B) are formed by defining the thicknesses W20 to W23.

A configuration of the lid portion 70 is further explained with reference to FIGS. 12A to 13B.

Figure 12A:
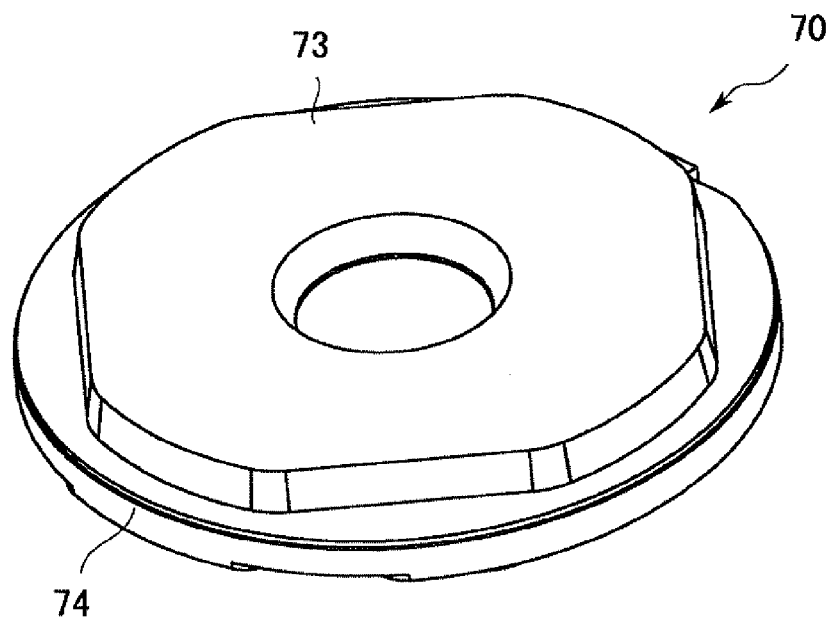
FIG. 12A is a schematic front perspective view and front view of a lid portion in accordance with a third exemplary embodiment of the present invention.
Figure 12B:
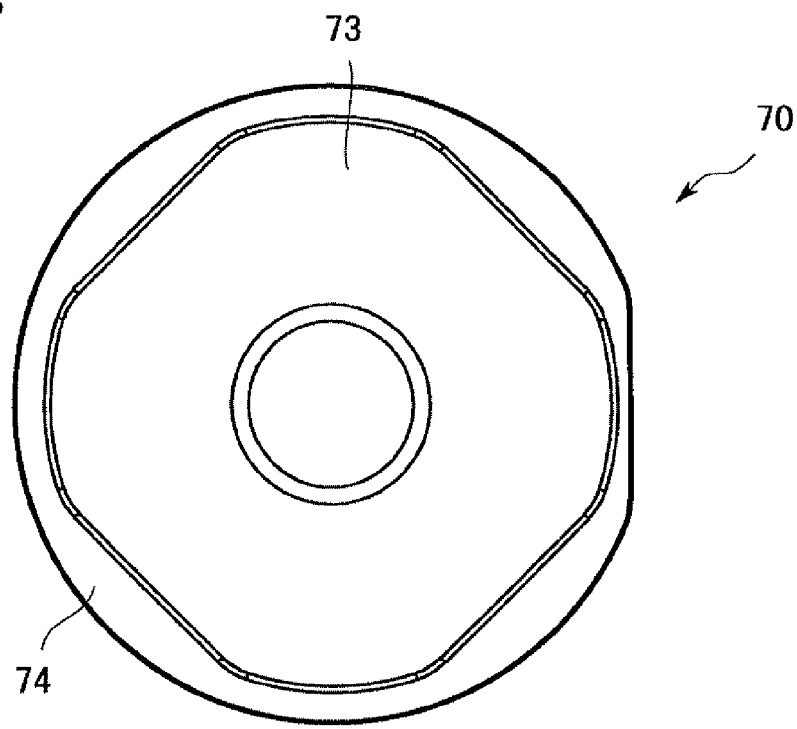
FIG. 12B is a schematic front perspective view and front view of a lid portion in accordance with a third exemplary embodiment of the present invention.

As shown in FIGS. 12A and 12B, an engaging portion 73 that engages with a rotation tool (for example, handle wrench) is formed on the front of the lid portion 70. The engaging portion 73 is a projecting portion protruding forward. The engaging portion 73 has a rectangular shape as viewed from the top. The lid portion 70 can be rotated by engaging a handle wrench with the engaging portion 73 and rotating the handle wrench in that state.

Figure 13A:
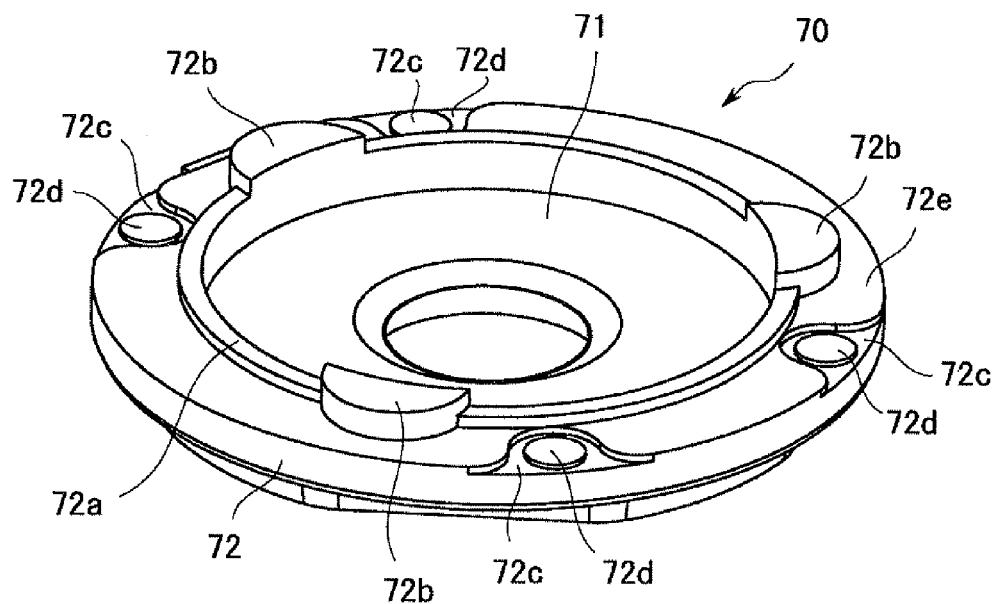
FIG. 13A is a schematic rear perspective view and rear view of a lid portion in accordance with a third exemplary embodiment of the present invention.
Figure 13B:
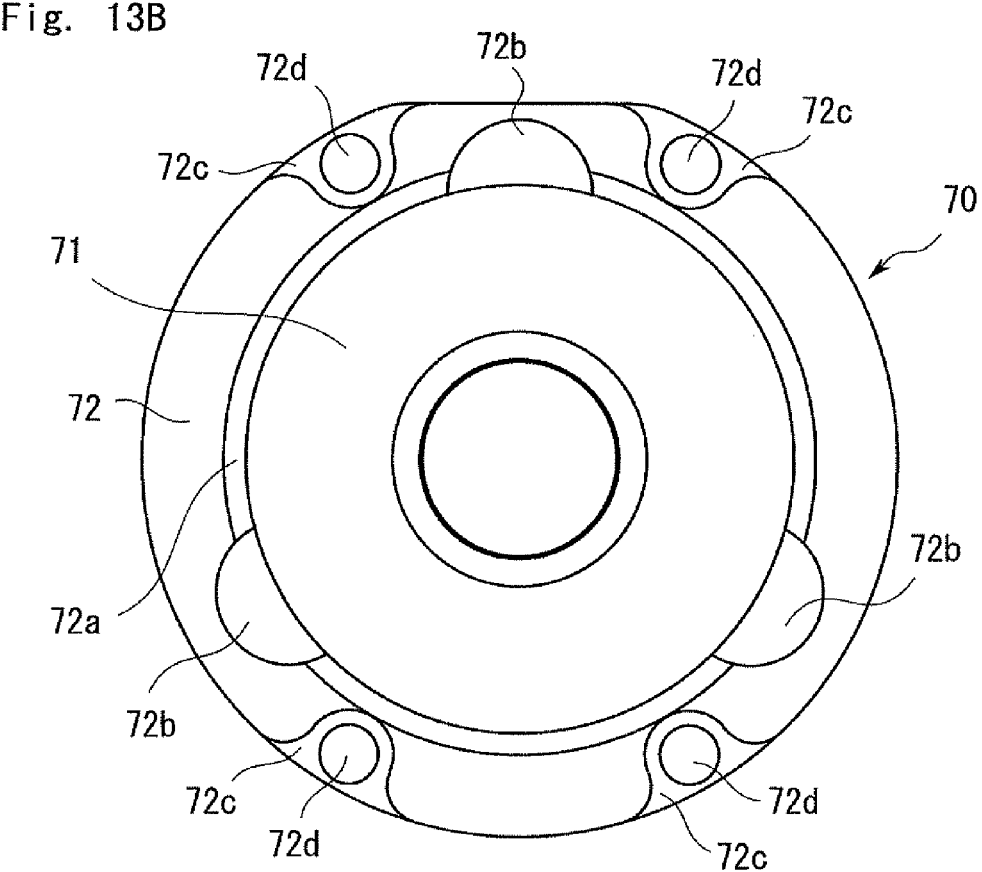
FIG. 13B is a schematic rear perspective view and rear view of a lid portion in accordance with a third exemplary embodiment of the present invention.

As shown in FIGS. 13A and 13B, wall portions 72a, protrusions 72b, recesses 72c, and island portions 72d are formed on the back of the lid portion 70.

The wall portion 72a is a ring-shaped portion surrounding the optical axis AX. The wall portions 72a can effectively prevent dust from entering the lens unit 50 through a gap between the lid portion 70 and the tube portion 60.

The protrusions 72b are portions extending along the optical axis AX. The protrusions 72b are engaged with spaces SP1 between projecting portions 62 formed in the tube portion 60 (see FIGS. 14A and 14B). With the engagement of the protrusions 72b with the spaces SP, the force exerted from the rotation tool on the lid portion 70 is transferred to the tube portion 60. In this way, the lens unit 50 can be screwed into the holder 51 by applying a rotational force to the lid portion 70. Note that the plurality of protrusions 72b are coupled with each other by the above-described wall portions 72a.

The recesses 72c are formed on an outer side of the wall portions 72a. An island portion 72d is formed in each of the recesses 72c. The recesses 72c are portions in which the back of the lid portion 70 is partially recessed toward the light-entering side along the optical axis AX.

The island portions 72d are projecting portions protruding toward the light-exiting side along the optical axis AX. Each of the island portions 72d has a circular shape as viewed from the top. Note that the island portions 72d do not protrude beyond the surface in which the recesses 72c are formed. Each of the island portions 72d is entirely contained within the respective recess 72c.

The lid portion 70 is formed by injecting a resin into a space formed by a fixed metallic mold (lower mold) and a movable metallic mold (upper mold) and curing the injected resin. When the molded lid portion 70 is to be removed from the metallic molds, the lid portion 70 is removed from the metallic molds by pushing out the lid portion 70 with an eject pin(s) that is formed in advance in the metallic molds.

The above-described islands portions 72d are portions at which the eject pin(s) is disposed. The above-described recesses 72c are portions surrounding the portions at which the eject pin(s) is disposed. By forming the island portions 72d within the recesses 72c, the occurrence of burr at the boundary between the island portions 72d and the recesses 72c is prevented, and thereby preventing the placement surface 72e of the lid portion 70 placed on the upper surface of the tube portion 60 from being unleveled. That is, the burr and the island portions 72d are prevented from protruding beyond the placement surface 72e. Although the island portions 72d protrude from the recesses 72c in this example, they may be recessed.

The explanation is continued by referring to FIGS. 11A and 11B again.

The tube portion 60 is a tube-like member extending along the optical axis. The tube portion 60 includes a receive portion that receives the lens 10 and another receive portion that receives the lenses 20 to 40. The tube portion 60 holds the lens 10 received in the receive portion such that the lens 10 can be moved. Further, the tube portion 60 holds the lenses 20 to 40 press-fitted in the receive portion such that they are pressed by the tube portion 60.

The opening width of the tube portion 60 becomes wider toward the bottom end in a successive manner so as to correspond to the lens widths of the lenses 10 to 40. The receive portion that receives the lens 10 is formed in the tube portion 60 by conforming the opening width of the tube portion 60 to the lens width of the lens 10. The receive portion that receives the lenses 20 to 40 is formed in the tube portion 60 by conforming the opening width of the tube portion 60 to the lens widths of the lenses 20 to 40.

The opening width of the receive portion of the tube portion 60 that receives the lens 10 is wider than the lens width W50 of the lens 10 by about 100 µm (note that the opening width of the receive portion of the tube portion 60 that receives the lens 10 is preferably wider than the lens width W50 of the lens 10 by about 30 to 150 µm) Meanwhile, the opening width of the receive portion of the tube portion 60 that receives the lens 20 is narrower than the lens width W51 of the lens 20 by about 5 µm (note that the opening width of the receive portion of the tube portion 60 that receives the lens 20 is preferably narrower than the lens width W51 of the lens 20 by about 0 to 15 µm (with the exception of 0)). The opening width of the receive portion of the tube portion 60 that receives the lens 30 is narrower than the lens width W52 of the lens 30 by about 10 µm (likewise the case described above, it may be a range from 0 to 15 µm (with the exception of 0)). The opening width of the receive portion of the tube portion 60 that receives the lens 40 is narrower than the lens width W53 of the lens 40 by about 5 µm (likewise the case described above, it may be a range from 0 to 15 µm (with the exception of 0)).

The lens 10 can be moved in the XZ-plane when it is placed on the tube portion 60. Therefore, the lens 10 is placed on the lens unit 50 and moved in the XZ-plane to find a place where the MTF characteristic is maximized. Then, the alignment can be achieved by fixing the lens 10 at the place where the MTF characteristic is maximized.

In this exemplary embodiment, the lens 10, which requires alignment, is received in the tube portion 60 such that the lens 10 can be moved. When the lens 10 is placed above the lens 20, the peripheral edge 13 on the object side of the flange portion 12 of the lens 10 is located closer to the object side than the front (front-end surface) 61 of the tube portion 60 is. In this way, it is possible to attach a jig directly to the side of the flange portion 12 (surface extending along the optical axis AX) of the lens 10.

As a technique to move a small component to another place, a method in which such a component is moved by sucking it has been known. However, since the lens 10 is a very small optical component, sucking the lens 10 in a desirable state is sometimes difficult. In this example, in consideration that the lens 10 is small, a jig is attached to the side of the flange portion 12 of the lens 10. By doing so, the lens 10 can be moved in a state where the lens 10 is reliably grasped. Further, the time required for the positioning process of the lens 10 can be effectively shortened.

Further, in this exemplary embodiment, the lens 10, which requires alignment, is received in the receive portion of the tube portion 60 such that the lens 10 can be moved, while the lenses 20 to 40, which do not require alignment, are pressed into the receive portion of the tube portion by applying a pressure. Since the lenses 10 to 40 do not need to be stacked before being attached in the lens barrel, the assembling of the lens unit can be simplified. Since the lenses 20 to 40, which do not require alignment, are held in the tube portion 60 in advance in a state where they are pressed by the tube portion 60, the lens 10 can be placed above the lens 20 and moved in the XZ-directions in a stable manner. Since the lenses 20 to 40 are simply pressed into the tube portion 60 by applying a pressure, the assembling of the lens unit 50 is very simple. Further, since a sufficient adhesive space is secured between the lens 10 and the tube portion 60, the lens 10 can be reliably and fixedly bonded to the tube portion 60.

As shown in FIG. 11A, projecting portions 62 protruding toward the lens 10 are formed in the upper-end portion of the tube portion 60. Each of the projecting portions 62 includes a thick portion 62a and a thin portion 62b. The thickness (width) of the thick portion 62a along the optical axis AX is thicker than the thickness (width) of the thin portion 62b along the optical axis AX.

The projecting portions 62 function as a regulation portion to regulate the movable range of the lens 10. By providing the regulation portion in the tube portion 60, the alignment can be achieved just by moving the lens 10 slightly. Further, sufficient adhesive spaces (spaces SP1) can be secured by forming the projecting portions 62.

Figure 14A:
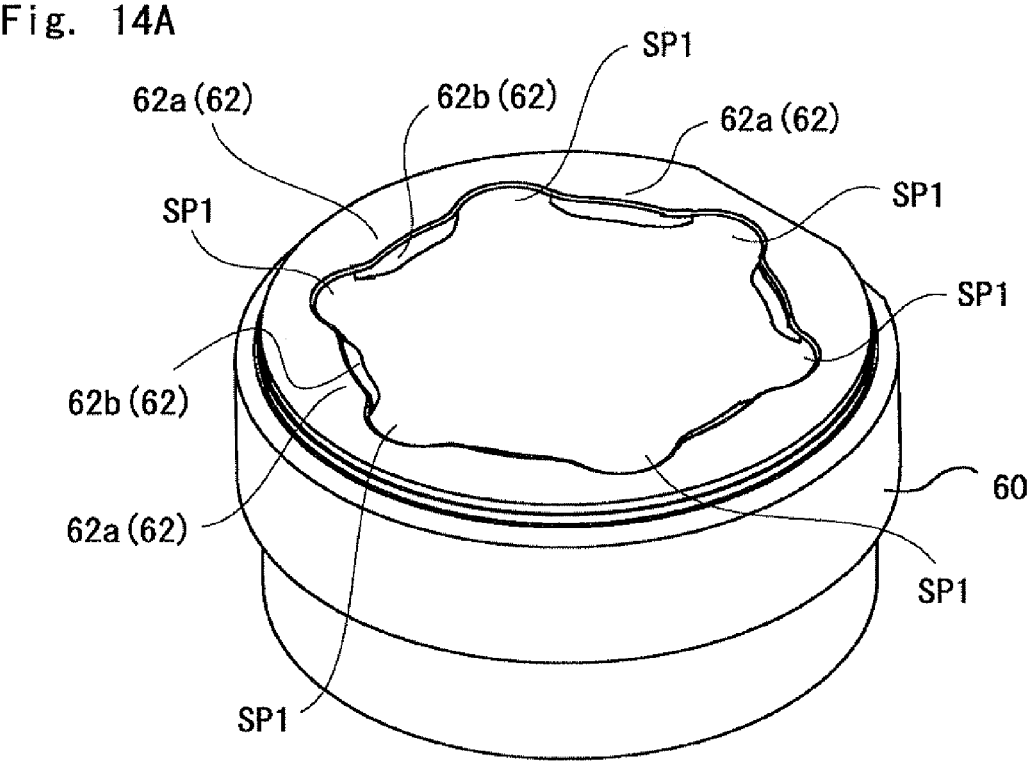
FIG. 14A is a schematic perspective view and top-surface view of a tube portion 60 in accordance with a third exemplary embodiment of the present invention.
Figure 14B:
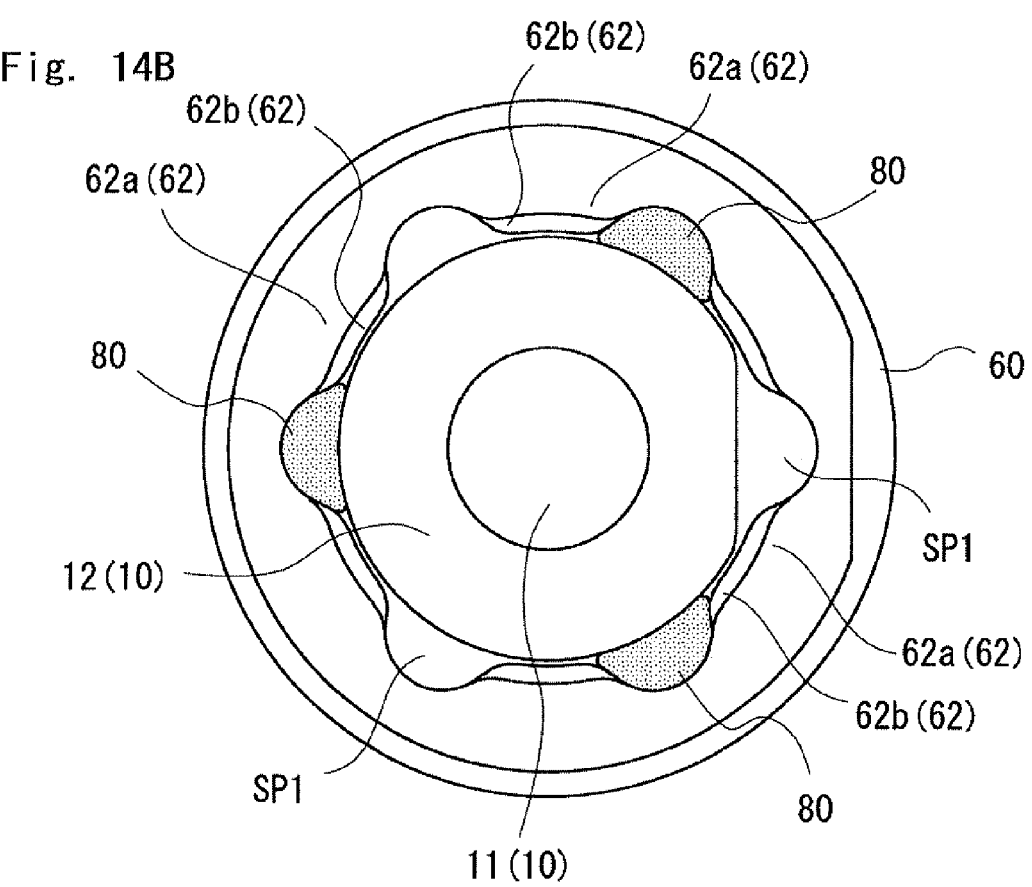
FIG. 14B is a schematic perspective view and top-surface view of a tube portion 60 in accordance with a third exemplary embodiment of the present invention.

A configuration of the tube portion 60 that receives the lenses 10 to 40 is explained with reference to FIGS. 14A and 14B. Note that FIG. 14A is a schematic perspective view of the tube portion 60. FIG. 14B is a schematic plane view of the tube portion 60 (in a state where the lens 10 is fixed by an adhesive 80).

As shown in FIGS. 14A and 14B, the projecting portions 62 are successively arranged along a circle centered on the optical axis AX. Recessed portions are formed between neighboring projecting portions 62.

The shape of each of the recessed portions formed between neighboring projecting portions 62 is preferably an arc shape as viewed from the top. The mechanical strength of the tube portion 60 can be effectively increased by forming each recessed portion in an arc shape as viewed from the top. Further, the lenses 20 to 40 and the support member 110 can be inserted into the tube portion 60 by applying a sufficient force.

An adhesive that is used to fix the lens 10 to the tube portion 60 directly or indirectly is applied to three spaces SP1 formed by the projecting portions 62. The lens 10 is firmly and fixedly bonded to the lens 20 or to both the tube portion 60 and the lens 20 by applying the adhesive to the spaces SP1.

Protrusions 72b formed on the back of the lid portion 70 are inserted into remaining three spaces SP1 (see FIGS. 13A and 13B). As described above, with the engagement of the protrusions 72b in the spaces SP1, the force exerted on the lid portion 70 is effectively transferred to the tube portion 60. The lens unit 50 can be screwed into the holder 51 by applying a rotational force to the lid portion 70.

In this exemplary embodiment, among the six spaces SP1, three spaces are used as spaces to receive an adhesive and remaining three spaces are used as spaces to receive the protrusions 72b. By arranging two sets of spaces each for a different purpose in the same plane, the tube portion 60 can be reduced in thickness.

Each component included in the lens unit 50 has the following positional relation. The lenses 10 to 40 are stacked along the optical axis AX. The optical shield sheet 98 is disposed between the lenses 20 and 30. The optical shield sheet 99 is disposed between the lenses 30 and 40. The tube portion 60 houses the lenses 10 to 40. The lid portion 70 is fixed on the front of the tube portion 60.

Each of the optical shield sheets 98 and 99 has an opening at a place corresponding to the optical axis AX of the lenses. Each of the optical shield sheets 98 and 99 has a circular shape as viewed from the top. The width of the optical shield sheet 98 along the X-axis is narrower than the width of the optical shield sheet 99 along the X-axis. Note that the opening formed on each of the optical shield sheets 98 and 99 is a circular opening.

The lenses 10 to 40 are molded from a resin (for example, cycloolefin polymer resin) by using a metallic mold(s). The tube portion 60 and the lid portion 70 are molded from a resin (for example, polycarbonate resin) by using a metallic mold(s). Note that the mutual bonding-property or adherence between the tube portion 60 and the lid portion 70 can be increased by using the same material for them.

After the alignment, the lens 10 is fixedly-bonded to the tube portion 60 by conventional fixing means (application of an adhesive 80 or the like). After that, the lid portion 70 is fixed on the tube portion 60 by conventional fixing means (application of an adhesive 80 or the like) (alternatively, the lid portion 70 may be fixedly-bonded to either one or both of the tube portion 60 and the lens 10). Note that in this process, since the adhesive can be externally applied, the lens 10 and the lid portion 70 can be fixedly-bonded to the tube portion 60 with ease.

Supplementary explanation of the shape of each lens is made hereinafter with reference to FIG. 11B. As shown in FIG. 11B, the lens 10 includes a lens portion 11 and a flange portion 12. The lens portion 11 has a lens surface 11a and a lens surface 11b. The flange portion 12 includes an outer portion 12a having a thickness W1, a middle portion 12b having a thickness W2, and an inner portion 12c having a thickness W3. A relation "W1<W2" is satisfied. A relation "W3≦W2" is satisfied. The thickness W3 becomes gradually thinner toward the optical axis AX.

The boundary portion between the outer portion 12a and the middle portion 12b corresponds to the boundary portion between the mold for the outer portion 12a (first mold) and the mold for the middle portion 12b (second mold). By determining the thickness of the outer portion 12a and the thickness of the middle portion 12b as described above, it is possible to effectively prevent the position of the lens from being deviated from a desired position due to burr and the like that is likely to occur at the boundary portion of the molds.

Likewise the lens 10, the lens 20 also includes a lens portion 21 and a flange portion 22. The flange portion 22 includes an outer portion 22a having a thickness W4 and an inner portion 22b having a thickness W5. A relation "W4<W5" is satisfied. The boundary portion between the outer portion 22a and the inner portion 22b corresponds to the boundary portion between the mold for the outer portion 22a and the mold for the inner portion 22b. By determining the thickness of the outer portion 12a and the thickness of the middle portion 12b as described above, it is possible to effectively prevent the position of the lens 20 from being deviated from a desired position due to burr and the like that is likely to occur at the boundary portion of the molds.

Likewise the lens 10, the lens 30 also includes a lens portion 31 and a flange portion 32. The flange portion 22 includes an outer portion 32a having a thickness W6 and an inner portion 32h having a thickness W7. A relation "W6<W7" is satisfied. The boundary portion between the outer portion 32a and the inner portion 32b corresponds to the boundary portion between the mold for the outer portion 32a and the mold for the inner portion 32b. By determining the thickness of the outer portion 32a and the thickness of the inner portion 32b as described above, it is possible to effectively prevent the position of the lens 30 from being deviated from a desired position due to burr and the like that is likely to occur at the boundary portion of the molds.

Note that a slope 65, a slope 66, and a slope 67 are formed on the inner surface of the tube portion 60 as shown in FIG. 11B. The slope 65 regulates the position of the optical shield sheet 98 and the lens 30. The slope 66 regulates the position of the optical shield sheet 99 and the lens 40. The slope 67 regulates the position of the support member 110.

Assembling of the lens unit 50 is explained with reference to FIGS. 15A to 15D.

Figure 15A:
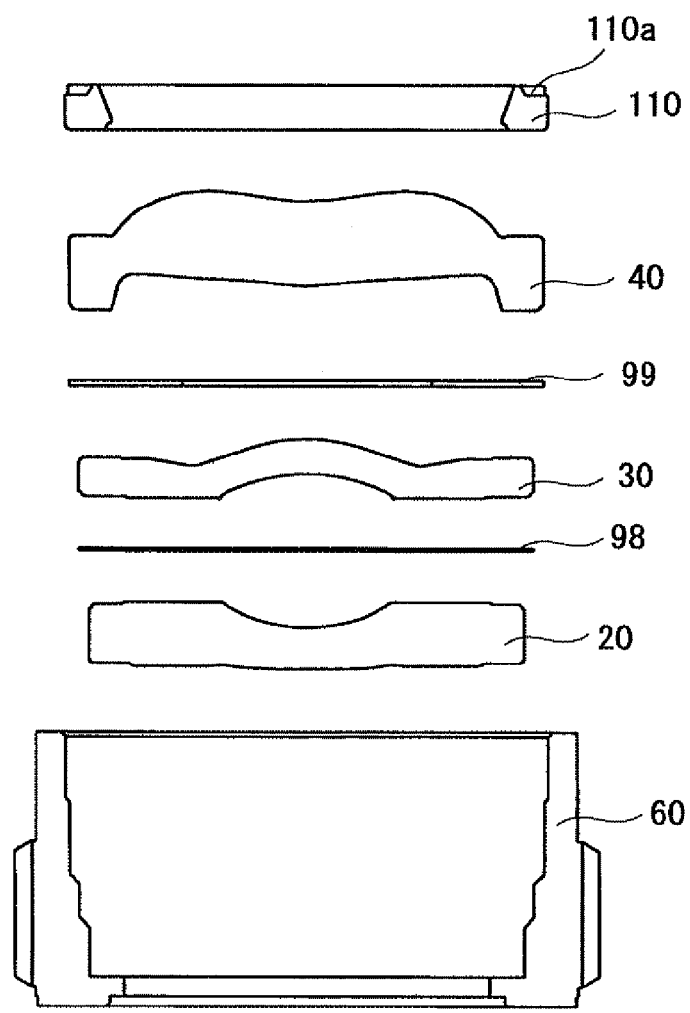
FIG. 15A is an explanatory figure showing an assembling procedure of a lens unit 50 in accordance with a third exemplary embodiment of the present invention.

Firstly, as shown in FIG. 15A, the lens 20, the lens 30, and the lens 40 are successively pressed into the receive portion of the tube portion 60, in this order, by applying a pressure. Note that the optical shield sheet 98 is disposed between the lenses 20 and 30. The optical shield sheet 99 is disposed between the lenses 30 and 40. Then, the stacked body of the lenses 20 to 40 is pressed into the tube portion 60 by applying a pressure with the support member 110. Next, the support member 110 is pressed into the tube portion 60 and fixedly-bonded to the tube portion 60 by conventional bonding means such as an adhesive. In this example, an ultraviolet-curable resin is applied to a space between an adhesive resin reservoir portion 110a and the tube portion 60, and the ultraviolet-curable resin is cured by irradiating it with ultraviolet rays.

Figure 15B:
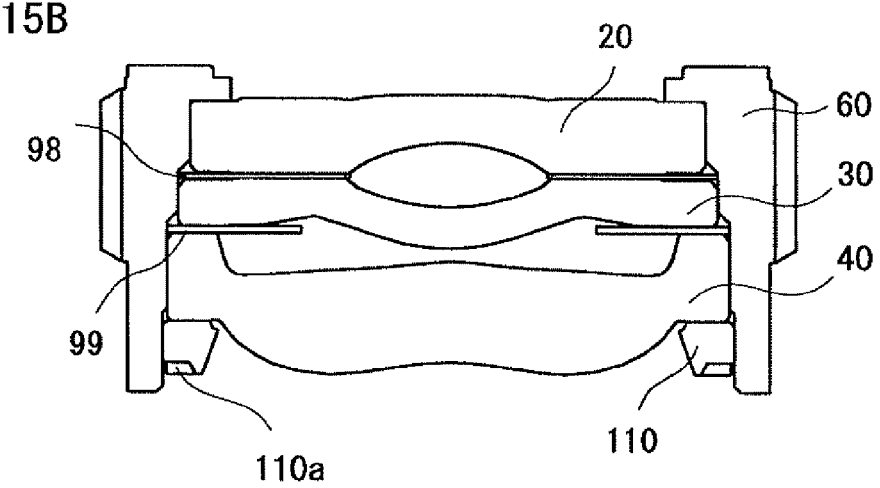
FIG. 15B is an explanatory figure showing an assembling procedure of a lens unit 50 in accordance with a third exemplary embodiment of the present invention.

Next, as shown in FIG. 15B, the tube portion 60 holding the lenses 20 to 40 is turned over.

Figure 15C:
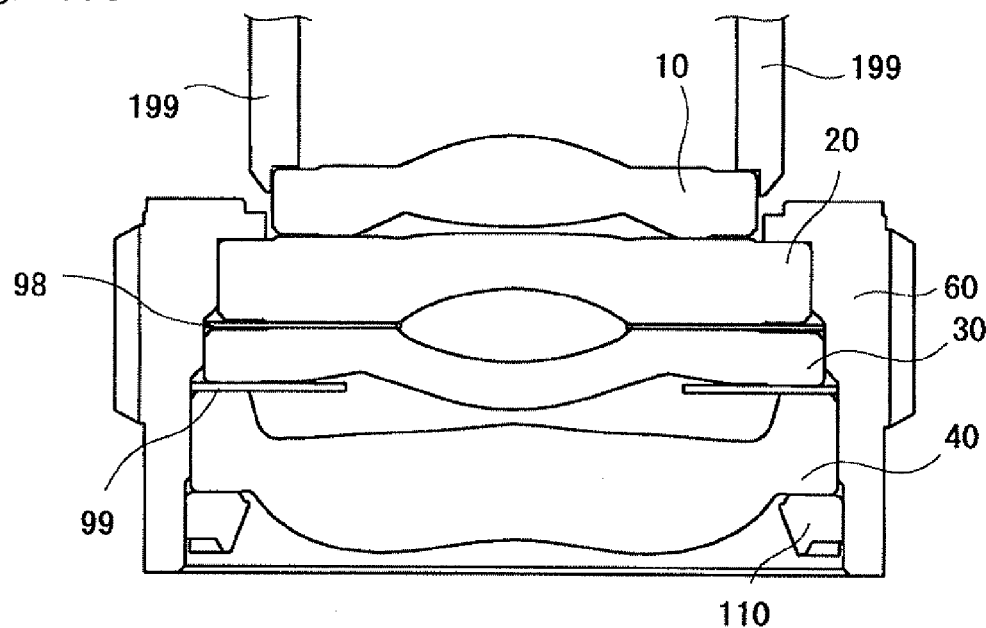
FIG. 15C is an explanatory figure showing an assembling procedure of a lens unit 50 in accordance with a third exemplary embodiment of the present invention.

Next, the lens 10 is placed above the lens 20 as shown in FIG. 15C. Then, a jig 199 is attached to the peripheral edge corner portion of the flange portion 12 of the lens 10. Then, while the lens 10 is grasped by the jig 199, the lens 10 is moved in the XZ-place and positioned at a place where the MTF characteristic is maximized. Then, an ultraviolet-curable adhesive is applied to the spaces SP1 between the lens 10 and the tube portion 60 and, after that, the ultraviolet-curable adhesive is irradiated with ultraviolet rays. In this way, the lens 10 is reliably and fixedly bonded to the tube portion 60 directly or indirectly through the adhesive in a state where the lens 10 is aligned (alternatively, the lens 10 may be fixedly-bonded to either one or both of the tube portion 60 and the lens 20). Note that the ultraviolet-curable adhesive may be applied before the lens 10 is placed. Then, after the lens 10 is aligned, the ultraviolet-curable adhesive may be irradiated with ultraviolet rays.

Figure 15D:
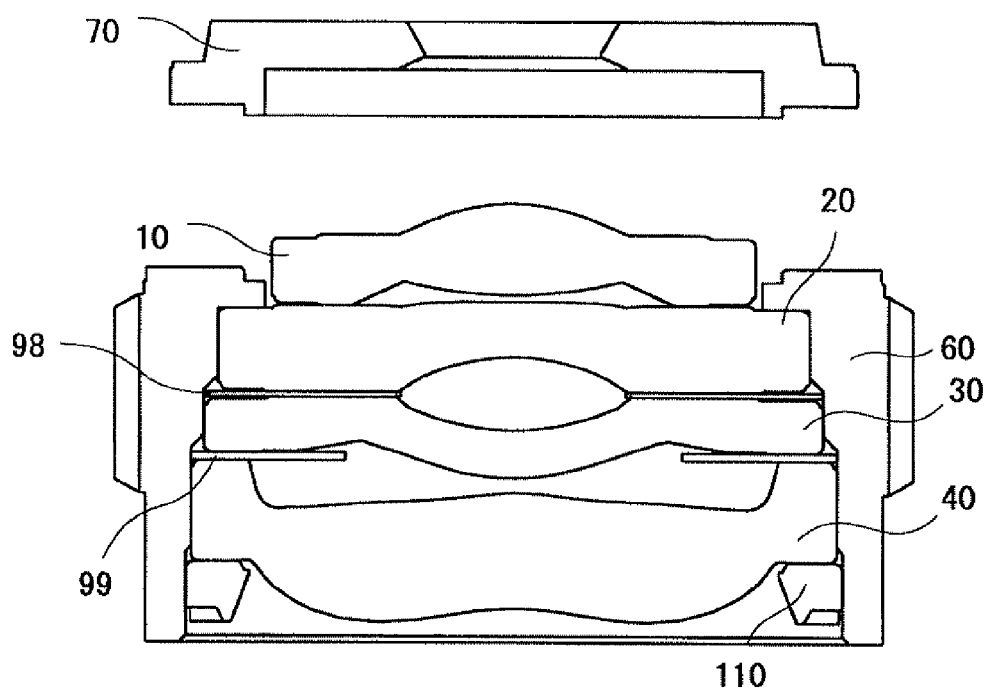
FIG. 15D is an explanatory figure showing an assembling procedure of a lens unit 50 in accordance with a third exemplary embodiment of the present invention.

Next, as shown in FIG. 15D, the lid portion 70 is placed above the lens 10. Then, an ultraviolet-curable adhesive is applied to a gap between the lid portion 70 and the tube portion 60 and, after that, the ultraviolet-curable adhesive is irradiated with ultraviolet rays. In this way, the lid portion 70 is fixedly-bonded to the tube portion 60 through the adhesive. Either of a thermosetting-type adhesive and an air-setting-type adhesive may be used as the adhesive for the lid portion 70 and the tube portion 60.

In this exemplary embodiment, the lens 10, which requires alignment, is received in the tube portion 60 such that the lens 10 can be moved. When the lens 10 is placed above the lens 20, the peripheral edge 13 on the object side of the flange portion 12 of the lens 10 is located closer to the object side than the front (front-end surface) 61 of the tube portion 60 is. In this way, it is possible to attach a jig directly to the side of the flange portion 12 (surface extending along the optical axis AX) of the lens 10. By doing so, the lens 10 can be moved in a state where the lens 10 is reliably grasped. Further, the time required for the positioning process of the lens 10 can be effectively shortened.

Further, in this exemplary embodiment, the lens 10, which requires alignment, is placed on the tube portion 60. Then, the lens 10 is moved in the XZ-plane in this state and positioned at a place where the MTF characteristic is maximized. Further, the lens 10 is fixed to the tube portion 60 at that place by an ultraviolet-curable resin or the like. Therefore, the problems like the ones that occur in the case of the lens unit 200 (poor workability, narrow adhesive space, and the like) are effectively solved. Further, since each of the lenses does not need to have a convexo-concave portion in its flange portion and hence the lenses are less complex in comparison to the lenses of the reference example, the lenses can be easily molded.

Fourth Exemplary Embodiment

A fourth exemplary embodiment in accordance with the present invention is explained hereinafter with reference to FIGS. 16 and 17. It is a perspective view.

In this exemplary embodiment, specific shapes of the lens 10, the tube portion 60, and the lid portion 70 are different from those in the third exemplary embodiment. Even in the case like this, similar advantageous effects to those of the third exemplary embodiment can be achieved.

Figure 16:
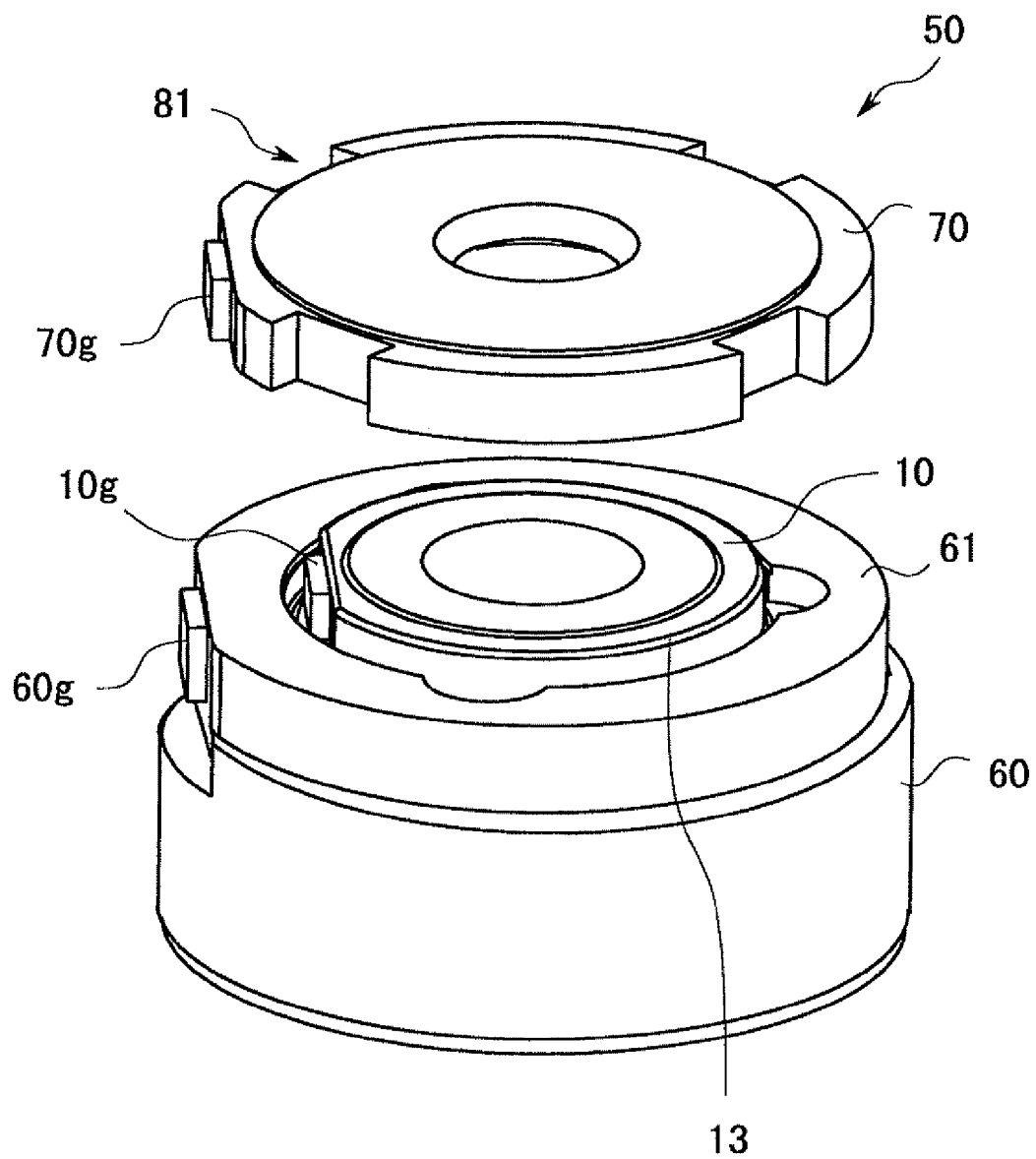
FIG. 16 is a perspective view of a lens unit 50 in accordance with a fourth exemplary embodiment of the present invention.

As shown in FIG. 16, four recessed portions (engaging portions) 81 are formed in the lid portion 70. A rotating jig is engaged with the recessed portions 81 to rotate the lid portion 70.

Figure 17:
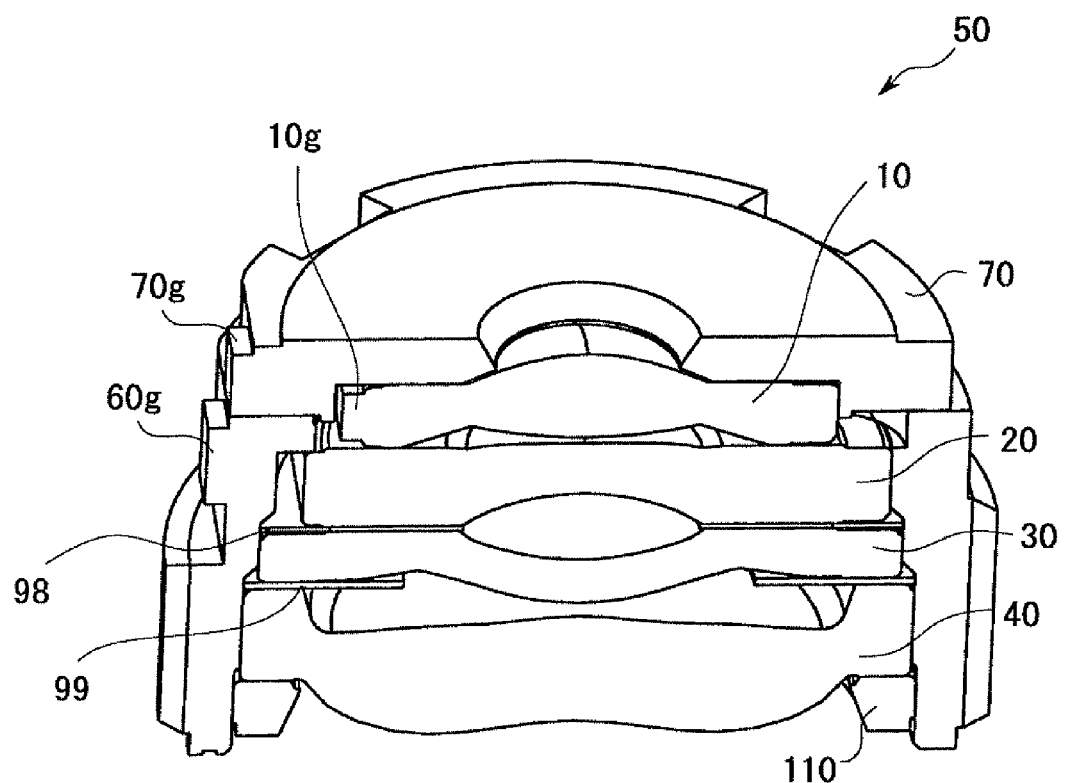
FIG. 17 is a perspective view showing a cross-sectional configuration of a lens unit 50 in accordance with a fourth exemplary embodiment of the present invention.

As shown in FIGS. 16 and 17, a gate portion 70g is formed on the side of the lid portion 70. The gate portion 70g is a portion in which a resin that was left in the injection passage for the resin is cured and is left unremoved when the gate is cut off. Note that if the gate is completely cut off from its root, the gate portion 70g does not exist in the completed lid portion 70.

A gate portion 60g is formed on the side of the tube portion 60. The gate portion 60g is a portion in which a resin, which was left in the injection passage for the resin, is cured and is left unremoved when the gate is cut off.

A gate portion 10g is formed on the side of the lens 10. The gate portion 10g is a portion in which a resin, which was left in the injection passage for the resin, is cured and is left unremoved when the gate is cut off.

Fifth Exemplary Embodiment

A fifth exemplary embodiment in accordance with the present invention is explained hereinafter with reference to FIG. 18.

Figure 18:
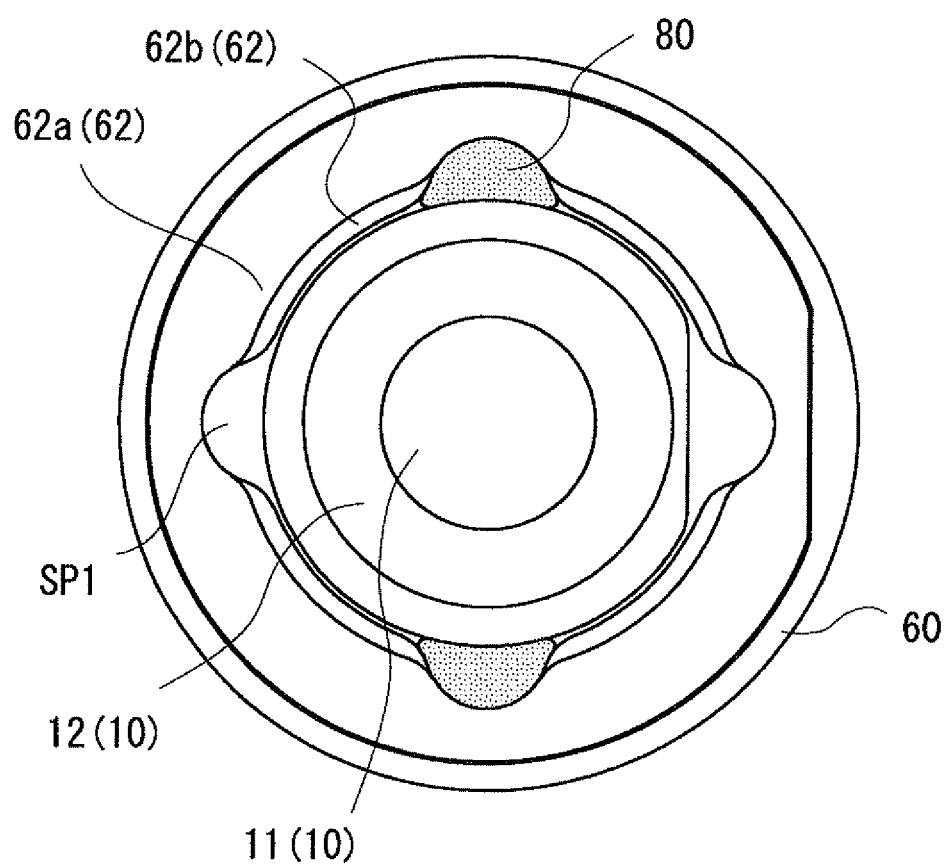
FIG. 18 is a schematic diagram for explaining a variation of the upper-surface configuration of a tube portion 60 in accordance with a fifth exemplary embodiment of the present invention.

As shown in FIG. 18, four projecting portions 62 are formed in the tube portion 60. Even in this case, similar advantageous effects to those of the third exemplary embodiment can be achieved. Note that the lens 10 can be fixedly-bonded directly or indirectly to the tube portion 60 more firmly by increasing the number of the projecting portions 62 and thereby increasing the number of places into which the adhesive is injected.

The technical scope of the present invention is not limited to the above-described exemplary embodiments. Specific shapes of the lenses, the lid portion, and the tube portion may be arbitrarily determined. The lens unit and the camera module can be incorporated into various electronic devices. The assembling procedure of the lens unit and the camera module may be also arbitrarily determined.

INDUSTRIAL APPLICABILITY

The present invention is applicable, for example, to lens units and camera modules.

The invention claimed is:
1. A lens unit comprising:
a plurality of lenses each comprising a lens portion and a flange portion surrounding the lens portion; and
a holder body that holds one lens and other lenses of the plurality of lenses that are successively arranged along an optical axis, wherein
the holder body comprises first receive portions and a second receive portion successively formed along the optical axis,
the first receive portions are shaped such that the first receive portions can receive the other lenses from a first direction that is parallel to the optical axis and receive them in a state where the received other lenses are press-fitted in the first receive portions so that the received other lenses are prevented from moving in a direction perpendicular to the optical axis by restricting the received other lenses in a radial direction thereof, the second receive portion is shaped such that the second receive portion can receive the one lens from a second direction which is opposite to the first direction and receive it in a state where the received one lens can be moved in the direction perpendicular to the optical axis, the first receive portions hold the other lenses, the second receive portion holds the one lens, and the flange portion of the one lens held within the second receive portion at least partially protrudes from an end of the second receive portion of the holder body in the first direction.

2. The lens unit according claim 1, wherein a peripheral edge of the flange portion of the one lens received in the second receive portion of the holder body protrudes from the end of the second receive portion of the holder body in the first direction.

3. The lens unit according to claim 1, wherein the one lens received in the second receive portion of the holder body is disposed above a lens held by one of the first receive portions of the holder body.

4. The lens unit according to claim 1, wherein the first receive portions of the holder body hold at least one of the other lenses by pressing a side of the flange portion that extends along the optical axis.

5. The lens unit according to claim 1, wherein the one lens received in the second receive portion of the holder body is located at a place closest to an object side.

6. The lens unit according to claim 1, wherein the second receive portion comprises a plurality of projections protruding toward the optical axis in an inner surface of the second receive portion, and an adhesive that is used to fix the one lens received in the second receive portion of the holder body is disposed in at least one of recessed spaces formed by mutually adjacent projections.

7. The lens unit according to claim 6, further comprising a lid body having an optical opening at a place corresponding to the optical axis, the optical opening being disposed above the holder on a second receive portion side, wherein a plurality of projecting portions that are fitted to the recessed spaces of the holder body are formed on a surface on a holder body side of the lid body.

8. The lens unit according to claim 7, wherein the adhesive is not injected into the recessed space to which the projecting portion is fitted.

9. The lens unit according to claim 7, wherein a wall portion surrounding the optic axis is formed on a surface on the holder body side of the lid body, and the plurality of the projecting portions are coupled with each other by the wall portion.

10. The lens unit according to claim 6, wherein a shape of the recessed portion as viewed from a top is an arc shape.

11. The lens unit according to claim 1, wherein a width of an opening through which the one lens is received into the second receive portion is wider than a width of the lens by 30 to 150 µm.

12. A camera module comprising:

a lens unit according to claim 1; and an image-capturing element that captures an image formed through the plurality of lenses.

13. A method of manufacturing a lens unit comprising a holder body that holds one lens and other lenses each comprising a lens portion and a flange portion surrounding the lens portion, wherein the holder body comprises first and second receive portions successively formed along an optical axis, the first receive portions receive the other lenses in a state where the received other lenses are press-fitted in the first receive portions so that the received other lenses are prevented from moving in a direction perpendicular to the optical axis, the second receive portion receives the one lens in a state where the received one lens can be moved in the direction perpendicular to the optical axis, the method comprising:

pressing the other lenses into the first receive portions of the holder body from a first direction which is parallel to the optical axis by applying a pressure;

putting the one lens within the second receive portion of the holder body from a second direction which is opposite to the first direction and in a state where the one lens can be moved in the direction perpendicular to the optical axis;

holding a jig against a side of the flange portion and thereby positioning the one lens in a place where an optical characteristic is optimized, the flange portion at least partially protruding from an end of the second receive portion of the holder body in the first direction when the one lens is put in the second receive portion; and fixedly-bonding the one lens located in the second receive portion to the second receive portion of the holder body.

14. A lens unit comprising:

a plurality of lenses each comprising a lens portion and a flange portion surrounding the lens portion; and a holder body that holds one lens and other lenses of the plurality of lenses that are successively arranged along an optical axis, wherein the holder body comprises first receive portions and a second receive portion successively formed along the optical axis, the first receive portions being disposed in a first direction relative to the second receive portion, the first receive portions hold the other lenses in a state where the held other lenses are press-fitted in the first receive portions so that the received other lenses are prevented from moving in a direction perpendicular to the optical axis, the second receive portion holds the one lens, there is a space between the second receive portion and the one lens during an assemble process, whereas the one lens is fixedly-bonded to the second receive portion after the assemble process, the space allowing the one lens to be moved in the direction perpendicular to the optical axis, and the flange portion of the one lens at least partially protrudes from an end of the second receive portion of the holder body in a second direction which is opposite to the first direction.

\* \* \* \* \*